(12) United States Patent
Grolleman et al.

(10) Patent No.: US 9,776,367 B2
(45) Date of Patent: Oct. 3, 2017

(54) UNLOADING SYSTEM AND METHOD FOR UNLOADING A TIRE TREAD CARRIER

(71) Applicant: VMI HOLLAND B.V., RK Epe (NL)

(72) Inventors: Henk-Jan Grolleman, RK Epe (NL); Roel Kramer, RK Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 15/129,777

(22) PCT Filed: Mar. 19, 2015

(86) PCT No.: PCT/NL2015/050178
§ 371 (c)(1),
(2) Date: Sep. 27, 2016

(87) PCT Pub. No.: WO2015/147637
PCT Pub. Date: Oct. 1, 2015

(65) Prior Publication Data
US 2017/0151738 A1     Jun. 1, 2017

(30) Foreign Application Priority Data
Mar. 27, 2014   (NL) ...................................... 2012515

(51) Int. Cl.
*B29D 30/00*     (2006.01)
*B65G 61/00*     (2006.01)

(52) U.S. Cl.
CPC ......... *B29D 30/0016* (2013.01); *B65G 61/00* (2013.01); *B29D 2030/0038* (2013.01)

(58) Field of Classification Search
CPC ...... B65G 65/00; B65G 61/00; B65G 47/902; B65G 47/914; B29D 2030/0038; B29D 30/0016

(Continued)

(56) References Cited

U.S. PATENT DOCUMENTS

| 1,597,631 | A | * | 8/1926 | Spindel | .................. | B29D 30/00 |
| | | | | | | 108/147 |
| 2,563,212 | A | * | 8/1951 | Cole | .................. | B29D 30/0016 |
| | | | | | | 108/2 |

(Continued)

FOREIGN PATENT DOCUMENTS

| CN | 202895712 | 4/2013 | ............. B29D 30/32 |
| DE | 2846006 | 4/1980 | ............. B29D 30/00 |

OTHER PUBLICATIONS

International Search Report and Written Opinion issued in application No. PCT/NL2015/050178, dated Jul. 13, 2015 (11 pgs).

(Continued)

*Primary Examiner* — Kaitlin Joerger
(74) *Attorney, Agent, or Firm* — Hayes Soloway P.C.

(57) ABSTRACT

Provided is an unloading system and a method for unloading a tire tread carrier, wherein the tire tread carrier includes a plurality of plates, wherein each plate is arranged for supporting at least one tread for a tire, wherein the unloading system includes an arm with a retaining device for picking up and retaining treads, wherein the arm is provided with a lifting device that is arranged to move together with the arm for lifting one of the plates, wherein a control system is arranged for controlling a drive system to position the arm in a starting position in which the lifting device extends at least partially underneath said one plate and to subsequently move the arm upwards such that the lifting device is moved towards a lifting position, thereby lifting said one plate; from the closed position towards the open position.

26 Claims, 14 Drawing Sheets

(58) Field of Classification Search
USPC .................. 414/758, 728, 736, 737, 783
See application file for complete search history.

(56) References Cited

U.S. PATENT DOCUMENTS

| | | | | |
|---|---|---|---|---|
| 4,822,236 | A * | 4/1989 | Inoue ..................... | B29C 31/00 198/468.4 |
| 5,368,678 | A * | 11/1994 | Miyamoto ......... | B29D 30/0016 156/405.1 |
| 5,392,630 | A * | 2/1995 | Marinoni ............... | B21D 43/24 414/797 |
| 5,433,815 | A * | 7/1995 | Aihara ............... | B29D 30/0016 156/131 |
| 5,700,128 | A * | 12/1997 | Tonnigs ............... | B65G 47/914 414/728 |
| 5,911,846 | A | 6/1999 | Tatara et al. .................. | 156/123 |
| 6,461,100 | B1 * | 10/2002 | Eisenzimmer ..... | B29D 30/0016 414/737 |
| 6,761,527 | B2 * | 7/2004 | Eisenzimmer ..... | B29D 30/0016 294/65 |
| 6,997,671 | B2 * | 2/2006 | Ruhli .................... | B65B 43/185 414/728 |
| 8,794,288 | B2 * | 8/2014 | Janszen .............. | B29D 30/0016 156/398 |
| 2015/0274420 | A1 * | 10/2015 | Krommer ............ | B65G 47/918 414/266 |
| 2015/0274440 | A1 * | 10/2015 | Strass .................. | B65G 47/918 414/798.2 |
| 2016/0107847 | A1 * | 4/2016 | Grunewald .............. | B21D 5/04 72/372 |
| 2017/0151738 | A1 * | 6/2017 | Grolleman ......... | B29D 30/0016 |

OTHER PUBLICATIONS

International Preliminary Report on Patentability issued in application No. PCT/NL2015/050178, dated Sep. 27, 2016 (7 pgs).

* cited by examiner

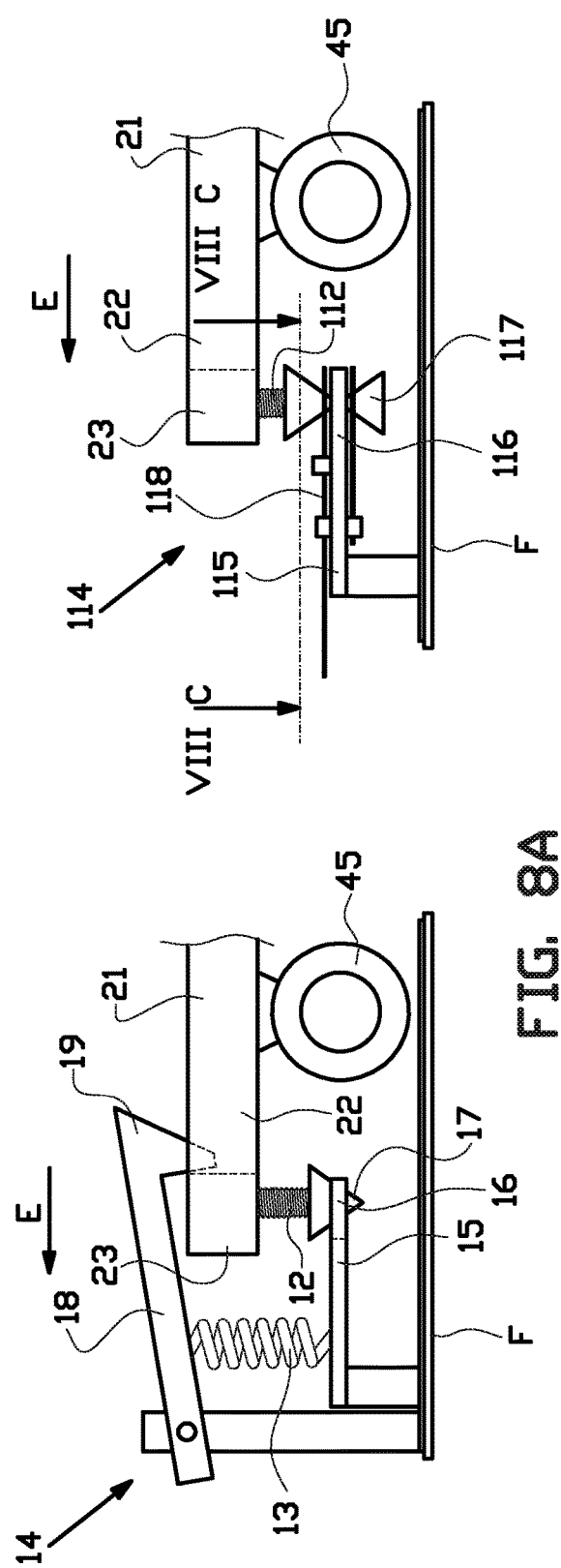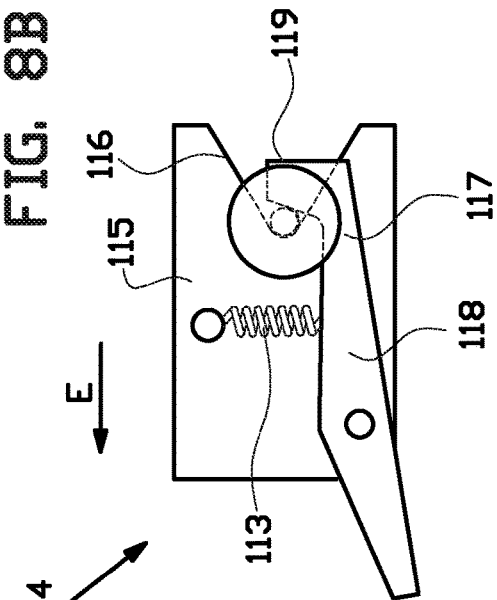

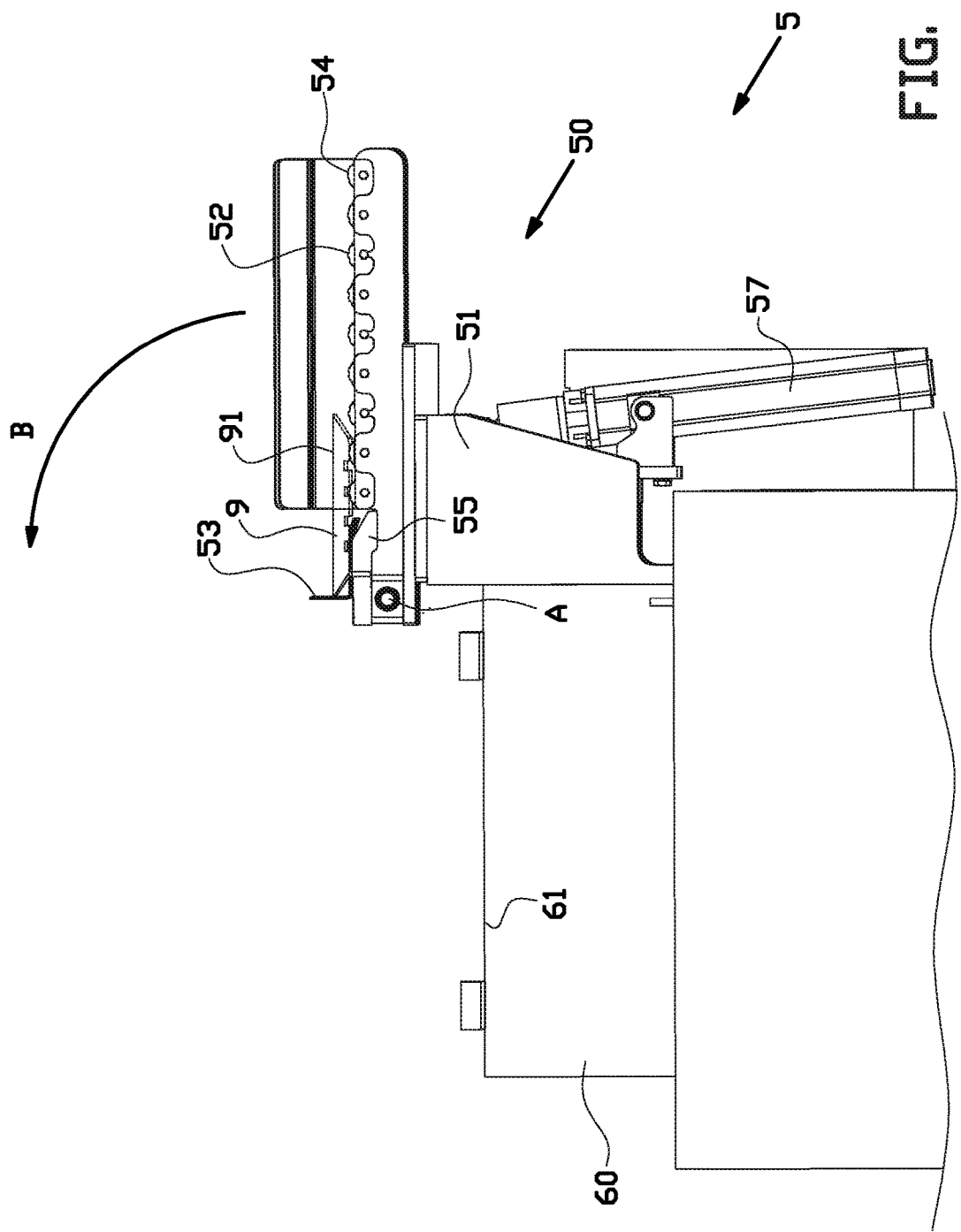

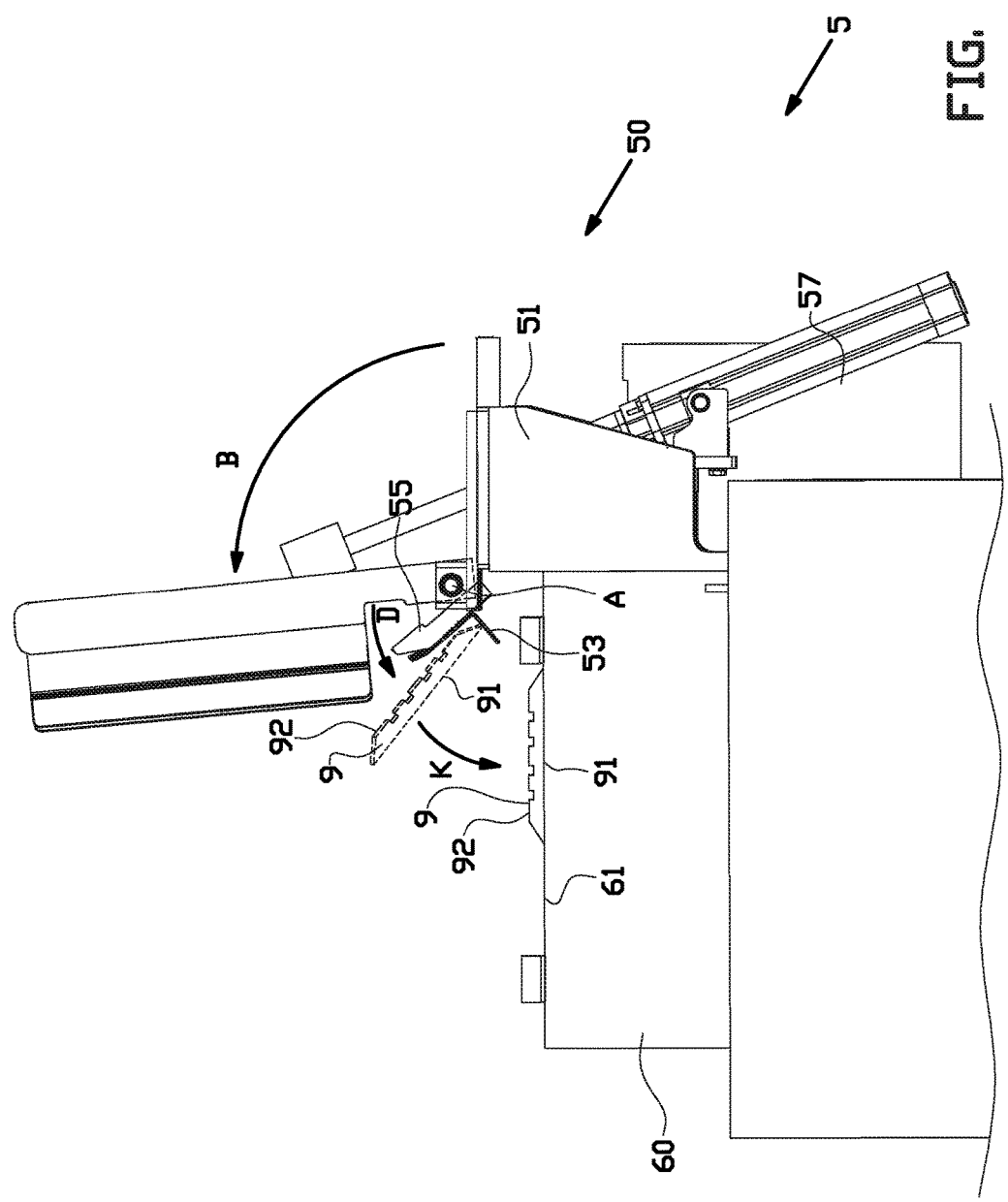

UNLOADING SYSTEM AND METHOD FOR UNLOADING A TIRE TREAD CARRIER

BACKGROUND

The invention relates to an unloading system and a method for unloading a tire tread carrier.

The Chinese utility model CN 202895712 U discloses a tread feeding system. The system is provided with a multi-leaf trolley positioning device, a multi-leaf trolley opening device controllable to open the leaf plates of the multi-leaf trolley one by one so as to pick the tread, a tread carrying device for moving the tread from the multi-leaf trolley to a tread overturning device and a tread overturning device for overturning the tread upside down.

The multi-leaf trolley comprises three groups of wheels, including a front wheel and a rear wheel, which are uniformly placed on the factory floor for providing mobility to the multi-leaf trolley. The multi-leaf trolley positioning device comprises a horizontal adjustment mechanism with a wedge block that is adjustable in height to lock the front wheel in place and a pushing plate that is urged by a pushing cylinder to support the rear wheel. According to the description of the Chinese utility model, the aforementioned horizontal adjustment mechanism is arranged for ensuring that the three groups of wheels are subjected to uniform force, such that the front and the rear end of the multi-leaf trolley can be maintained horizontal. Upon entry of the multi-leaf trolley, the horizontal adjustment mechanism is required to be flush with the factory floor, thereby making the system vulnerable to dirt entering and blocking the complex system.

The multi-leaf opening device comprises an upright rod fixed to the factory floor next to the multi-leaf trolley and a lifting lever which can be moved up and down along the upright rod to lift the leaf. According to the description of the Chinese utility model, the multi-leaf trolley opening device occupies little space and is particularly suitable for situations in which a large number of parts are arranged and space is not enough, such as in an integrated forming machine. It is noted however that the upright rod hinders the tread carrier device when approaching and accessing the multi-leaf trolley. Also, the fixed position of the upright rod does not allow for flexibility in handling multi-leaf trolleys with different dimensions.

The tread overturning device comprises a tread bearing bracket for receiving the tread transferred by the tread carrying device, a overturning row and a clamping row for in mutual cooperation clamping and rotating the tread. The overturning row and the clamping row are driven synchronously to maintain a clamping pressure so as to prevent the tread from being thrown away. The overturning row is driven by a rotating shaft and the clamping row is driven by a separate gear which is rotatably sleeved on the rotating shaft. The clamping can deform the tread during overturning and furthermore, the complex overturning system is prone to malfunctions.

It is an object of the present invention to provide an alternative unloading system and method for unloading a tire tread carrier, which at least partially solves one or more of the abovementioned drawbacks of the prior art.

SUMMARY OF THE INVENTION

According to a first aspect, the invention provides an unloading system for unloading a tire tread carrier, wherein the tire tread carrier comprises a frame and a plurality of plates which are hingably connected to the frame so as to be rotatable about respective, mutually parallel rotation axes for subsequent opening by rotation about said rotation axes from a closed, substantially horizontal position to an open, lifted position, wherein each plate is arranged for supporting at least one tread for a tire, wherein the unloading system comprises an arm with a retaining device for picking up and retaining treads from the plates, a drive system for moving the arm and a control system, operationally coupled to the drive system, wherein the control system is arranged for controlling the drive system to position the arm with respect to the tire tread carrier, wherein the arm is provided with a lifting device that is arranged to move together with the arm for lifting one of the plates, wherein the control system is arranged for controlling the drive system to position the arm in a starting position in which the lifting device extends at least partially underneath said one plate and to subsequently move the arm upwards such that the lifting device is moved towards a lifting position, thereby lifting said one plate from the closed position towards the open position.

By providing the lifting device on the arm, the arm can both lift the plates of the tire tread carrier and pick up and retain a tread supported on a directly underlying plate that is exposed by the lifting. By this integration of functions, the unloading system can be more compact, efficient and flexible.

In an embodiment the control system is arranged for controlling the drive system such that during the movement of the lifting device from the starting position towards the lifting position, the lifting device follows a lifting path with a curvature that is concentric to the rotation axis of the one plate. Thus, it can be ensured that the lifting device remains engaged with the one plate during a substantial part of the lifting path along the curvature. Furthermore, the plate may be securely engaged at the front edge only during the entire lifting, thereby reducing the required reach of the lifting device.

In an embodiment the drive system comprises at least a first drive and a second drive for moving the arm in a first direction and a second direction, respectively, wherein the control system is arranged for controlling the first drive and the second drive to move the arm in a lifting direction which is a sum of the movements in both the first direction and the second direction, wherein the control system is arranged for controlling the first drive and the second drive so that the lifting direction of the arm follows the curvature that is concentric to the rotation axis of the one plate. The two drives can thus provide movement of the arm along a curved path, thereby ensuring optimal engagement during lifting.

In an embodiment the lifting device comprises one or more hooks, wherein each hook is provided with an upwardly facing tip which is arranged to engage the one plate from below. The hook can not only lift, but also securely engage the one plate, thereby reducing the chance of the lifting device losing its engagement of the one plate.

In an embodiment the one or more hooks protrude from the arm such that, when the one or more hooks is in engagement with the one plate, solely said one or more hooks engage with or contact the one plate. Thus, it can be prevented that other components of the arm, such as the retaining device, interferes with the lifting of the one plate.

In an embodiment the one plate is provided one or more engagement elements for receiving the tips of the one or more hooks. The cooperation between the engagement elements and the hooks can further ensure a secure engagement of the one plate during lifting, thereby further reducing the chance of the lifting device losing its engagement of the one plate.

In an embodiment the arm comprises a pick-up beam that is arranged to extend parallel to the rotation axis of the one plate, wherein the lifting device comprises a plurality of the hooks which are distributed along the pick-up beam, wherein the plurality of the hooks is arranged for engaging the one plate along various spaced apart engagement positions parallel to its rotation axis. The lifting force exerted on the one plate can thus be spread over spaced apart engagement positions and the weight of the one plate can be divided over the hooks.

In an embodiment the retaining device is provided with one or more retaining elements, wherein the one or more hooks are provided on the one or more retaining elements. By providing the hooks on the retaining elements, a multi-functional retaining and lifting element is formed, which is capable of both lifting the one plate with the hook and retaining a tread with the retaining element. The integration can allow for a compact design.

In an embodiment the tire tread carrier is provided with a biasing element which is arranged for biasing the one plate into the open, lifted position, wherein the control system is arranged for controlling the drive system to move the arm such that the one plate is only partially lifted towards the open, lifted position, wherein the biasing element is arranged to contribute to the lifting to fully lift the one plate into the open, lifted position. Thus, the arm has to lift the one plate only partially and, after the biasing element takes over the lifting, can already start to move to a pick up position above one of the treads on the directly underlying plate that has been exposed by the at least partially lifted one plate.

In an embodiment the arm is provided with a first sensor for detecting the position of the one plate and for sending signals indicative of the position of the one plate to the control system, wherein the control system is arranged for controlling the drive system to move the arm into the starting position based on the signals from the first sensor. With the first sensor, the unloading system can at least partially be automated.

In an embodiment the arm is provided with a second sensor for detecting the position of at least one of the treads on the one plate and for sending signals indicative of the position of the at least one tread to the control system, wherein the control system is arranged for controlling the drive system to move the arm into a pick-up position based on the signals from the second sensor, wherein, in the pick-up position, the retaining device is located directly above the detected one tread to retain said detected one tread. With the second sensor, the unloading system can further be automated.

In an embodiment the treads are placed in an up-side-down orientation on the plates, wherein the unloading system further comprises a tire tread positioning device with a flipping assembly, wherein the flipping assembly is provided with a base and a flipping platform that is rotatable with respect to said base about a flipping axis between a substantially horizontal receiving position and a flipped position, wherein, when the flipping platform is in the receiving position, the arm is arranged for releasing a picked-up and retained tread onto the flipping platform in the up-side-down orientation with the longitudinal direction of the tread extending parallel to flipping axis, wherein the flipping actuator is arranged for rotating the flipping platform over an angle of at least ninety degrees, and preferably at least ninety-five degrees about the flipping axis from the receiving position to the flipped position, wherein during the rotation of the flipping platform, the tread is retained on the platform solely by gravity and wherein the tread is allowed to freely separate from the flipping platform under the influence of gravity. Since gravity is responsible for both retaining and separating the tread from the flipping platform, the flipping platform can be kept free of additional clamping or guiding means for the purpose of the retaining the tread on the flipping platform or for guiding the separation, respectively. The components contacting the tread during flipping and separation can be kept to a minimum, thereby reducing the chances of deformation.

In an embodiment the flipping platform is provided with an abutment element at the side of and extending parallel to the flipping axis for supporting the tread through abutting contact in a direction transverse to the longitudinal direction of the tread during the rotation from the receiving position towards the flipped position. The abutment element can prevent the tread from sliding of the side of the flipping platform during the flipping. The tread is retained against the abutment element under the influence of gravity.

In a preferred embodiment the flipping platform is provided with a conveyor, preferably a roller conveyor, for moving the tread transverse to its longitudinal direction into abutment with the abutment element.

In an embodiment the flipping platform is provided with a separation element which is arranged for at least partly supporting the tread on the flipping platform, wherein the separation element is arranged for rotation in a separation direction from a flush position in which the upper surface of the separation element is substantially flush with the remaining surface of the flipping platform and a separation position in which the separation element is raised with respect to the remaining surface of the flipping platform to separate the tread from said remaining surface. The separation element can assist the separation and may prevent the tread from sticking to the flipping platform.

In an embodiment the tire tread positioning device comprises a centering assembly adjacent to the flipping assembly, wherein the centering assembly is provided with a centering surface for receiving the tread from the flipping platform, wherein during the transfer of the tread from the flipping assembly to the centering assembly, the tread is flipped over an angle of one-hundred-and-eighty degrees from the up-side-down orientation into an up-side-up orientation, wherein the flipping platform, in the flipped position, has been rotated over only a part of the one-hundred-and-eighty degrees, preferably over less than one-hundred-and-twenty degrees, and most preferably over less than one-hundred degrees, wherein the tread is allowed to separate and fall over the remaining angle under the influence of gravity. The range of the rotation of the flipping platform can thus be limited, thereby reducing the range and the complexity of the flipping actuators.

In an embodiment the unloading system comprises the aforementioned tire tread carrier, wherein the frame of the tire tread carrier is provided with a bottom section having two longitudinal sides and two transverse sides, wherein the tire tread carrier is provided with a set of two fixed wheels mounted under said bottom section at or near the center of the longitudinal sides and a set of two swivel wheels mounted under said bottom section at or near the transverse sides, wherein the wheels are arranged for rolling over a factory floor, wherein the fixed wheels define a first clearance height between the bottom section and the factory floor and the swivel wheels define a second clearance height between the bottom section and the factory floor which is less than the first clearance height. Thus, the tire tread carrier may be balanced about the fixed wheels and, without intervention, will tend to tip towards one of the transverse sides until the respective swivel wheel of the tipped transverse side comes into contact with the factory floor. When balanced with both swivel wheels clear from the factory floor, the tire tread carrier can be easily pivoted or rotated on the spot, around the set of fixed wheels at the center thereof.

In an embodiment the unloading system comprises a receiving element which is arranged to be fixed to the factory floor at an unloading position for the tire tread carrier, wherein the tire tread carrier is provided with a coupling element that is arranged for insertion into the receiving element in an entry direction, wherein the receiving element is provided with a catch that cooperates with the coupling element to lock the tire tread carrier against retraction in a direction opposite to the entry direction. This can lock the tire tread carrier into place to prevent unwanted movement of the tire tread carrier during unloading.

In an embodiment the catch is arranged for catching behind a part of the frame of the tire tread carrier in a direction opposite to the entry direction. In an alternative embodiment the catch is arranged for catching behind the coupling element of the tire tread carrier in a direction opposite to the entry direction. In both cases, the catch ensure that the coupling element can be freely entered into the receiving element in the entry direction, but can not be removed in a direction opposite to the entry direction without unlocking the catch.

In an embodiment the coupling element and/or the receiving element are adjustable in height to adjust the angle of the tire tread carrier with respect to the factory floor. This allows for the tire tread carrier to be accurately leveled with its plates extending substantially horizontally, even when the factory floor is not completely horizontal or uneven.

According to a second aspect, the invention provides a method for unloading a tire tread carrier with the use of an unloading system, wherein the tire tread carrier comprises a frame and a plurality of plates which are hingably connected to the frame so as to be rotatable about respective, mutually parallel rotation axes for subsequent opening by rotation about said rotation axes from a closed, substantially horizontal position to an open, lifted position, wherein each plate is arranged for supporting at least one tread for a tire, wherein the unloading system comprises an arm with a retaining device for picking up and retaining treads from the plates, wherein the arm is provided with a lifting device that is arranged to move together with the arm for lifting one of the plates, wherein the method comprises the steps of positioning the arm in a starting position in which the lifting device extends at least partially underneath said one plate and subsequently moving the arm upwards such that the lifting device is moved towards a lifting position, thereby lifting said one plate from the closed position towards the open position.

By providing the lifting device on the arm, the arm can both lift the plates of the tire tread carrier and pick up and retain a tread supported on a directly underlying plate that is exposed by the lifting. By this integration of functions, the unloading system can be more compact, efficient and flexible.

In an embodiment, during the movement of the lifting device from the starting position towards the lifting position, the lifting device follows a lifting path with a curvature that is concentric to the rotation axis of the one plate. Thus, it can be ensured that the lifting device remains engaged with the one plate during a substantial part of the lifting path along the curvature. Furthermore, the plate may be securely engaged at the front edge only during the entire lifting, thereby reducing the required reach of the lifting device.

In an embodiment the treads are placed in an up-side-down orientation on the plates, wherein the unloading system further comprises a tire tread positioning device with a flipping assembly, wherein the flipping assembly is provided with a base and a flipping platform that is rotatable with respect to said base about a flipping axis between a substantially horizontal receiving position and a flipped position, wherein the method comprises the steps of releasing a picked-up and retained tread from the arm onto the flipping platform in the up-side-down orientation with the longitudinal direction of the tread extending parallel to flipping axis, rotating the flipping platform over an angle of at least ninety degrees, and preferably at least ninety-five degrees about the flipping axis from the receiving position to the flipped position, wherein during the rotation of the flipping platform, the tread is retained on the platform solely by gravity and wherein the tread is allowed to freely separate from the flipping platform under the influence of gravity. Since gravity is responsible for both retaining and separating the tread from the flipping platform, the flipping platform can be kept free of additional clamping or guiding means for the purpose of the retaining the tread on the flipping platform or for guiding the separation, respectively.

In an embodiment the flipping platform is provided with a separation element which is arranged for at least partly supporting the tread on the flipping platform, wherein the method comprises the step of rotating the separation element in a separation direction from a flush position in which the upper surface of the separation element is substantially flush with the remaining surface of the flipping platform and a separation position in which the separation element is raised with respect to the remaining surface of the flipping platform to separate the tread from said remaining surface. The separation element can assist the separation and may prevent the tread from sticking to the flipping platform.

In an embodiment the tire tread positioning device comprises a centering assembly adjacent to the flipping assembly, wherein the centering assembly is provided with a centering surface for receiving the tread from the flipping platform, wherein during the transfer of the tread from the flipping assembly to the centering assembly, the tread is flipped over an angle of one-hundred-and-eighty degrees from the up-side-down orientation into an up-side-up orientation, wherein after the step of rotating the flipping platform into the flipped position, the flipping platform has been rotated over only a part of the one-hundred-and-eighty degrees, preferably over less than one-hundred-and-twenty degrees, and most preferably over less than one-hundred degrees, wherein the method comprises the step of allowing the tread to separate and fall over the remaining angle under the influence of gravity. The range of the rotation of the flipping platform can thus be limited, thereby reducing the range and the complexity of the flipping actuators.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 8A shows a side view of a detail of the underside of the tire tread carrier according to FIG. 7;

FIGS. 8B and 8C show a top view and a side view, respectively, of an alternative detail of the underside of the tire tread carrier according to FIG. 7;

FIGS. 10A and 10B show front views of the tire tread positioning device according to FIG. 9 in two positions.

DETAILED DESCRIPTION OF THE INVENTION

Figure 1:
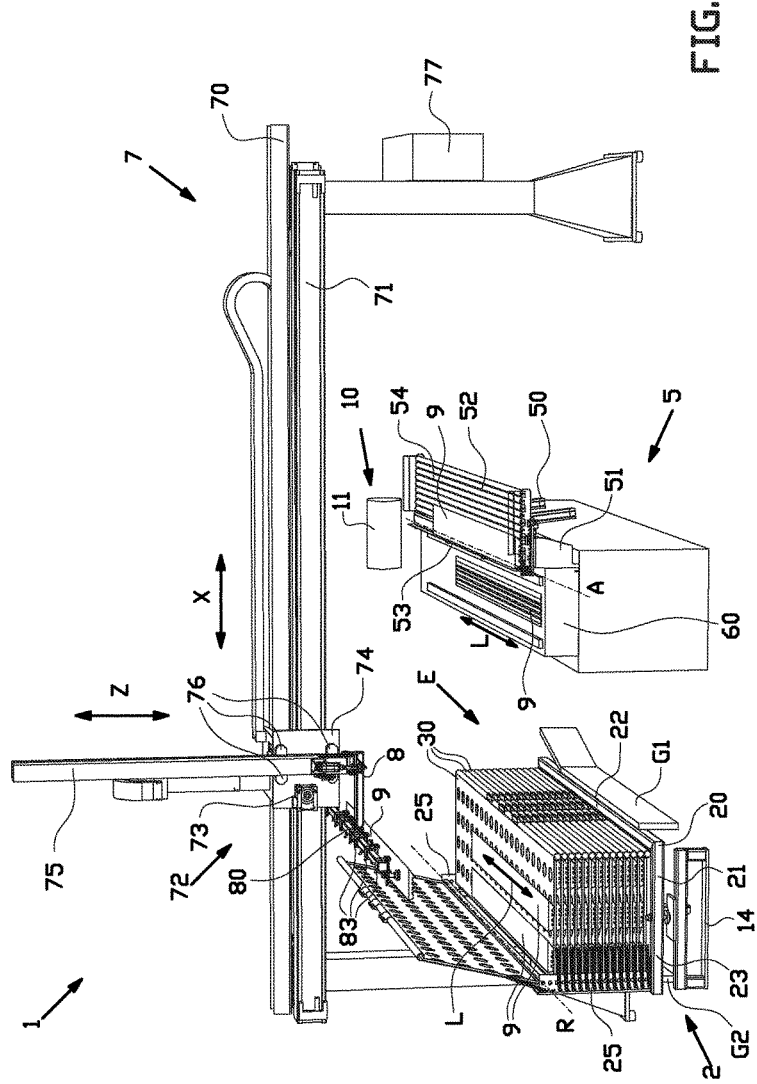
FIG. 1 shows an overview in perspective of the unloading system according the invention, comprising a tire tread carrier, an arm and a tire tread positioning device.

FIG. 1 shows an unloading system 1 according to an exemplary embodiment of the invention, for unloading tire treads which are used in known methods for building or retreading of tires.

The unloading system 1 comprises a tire tread carrier 2 for storing a plurality of elongate treads 9 in pre-cut lengths and a tire tread positioning device 5 for receiving the treads 9 from the tire tread carrier 2 and for positioning the received treads 9 for processing in a further station 10 of a tire building machine (not shown in detail). Such a further station may comprise a building drum 11 with a carcass, to which the positioned treads 9 are fed for application in the circumferential direction of the drum around the carcass. The unloading system 1 further comprises a tire tread transfer device 7 for picking up and transferring the treads 9 from the tire tread carrier 2 to the tire tread positioning device 5.

The abovementioned components of the unloading system 1 will be described in more detail hereafter with reference to FIGS. 1-8.

Figure 6:
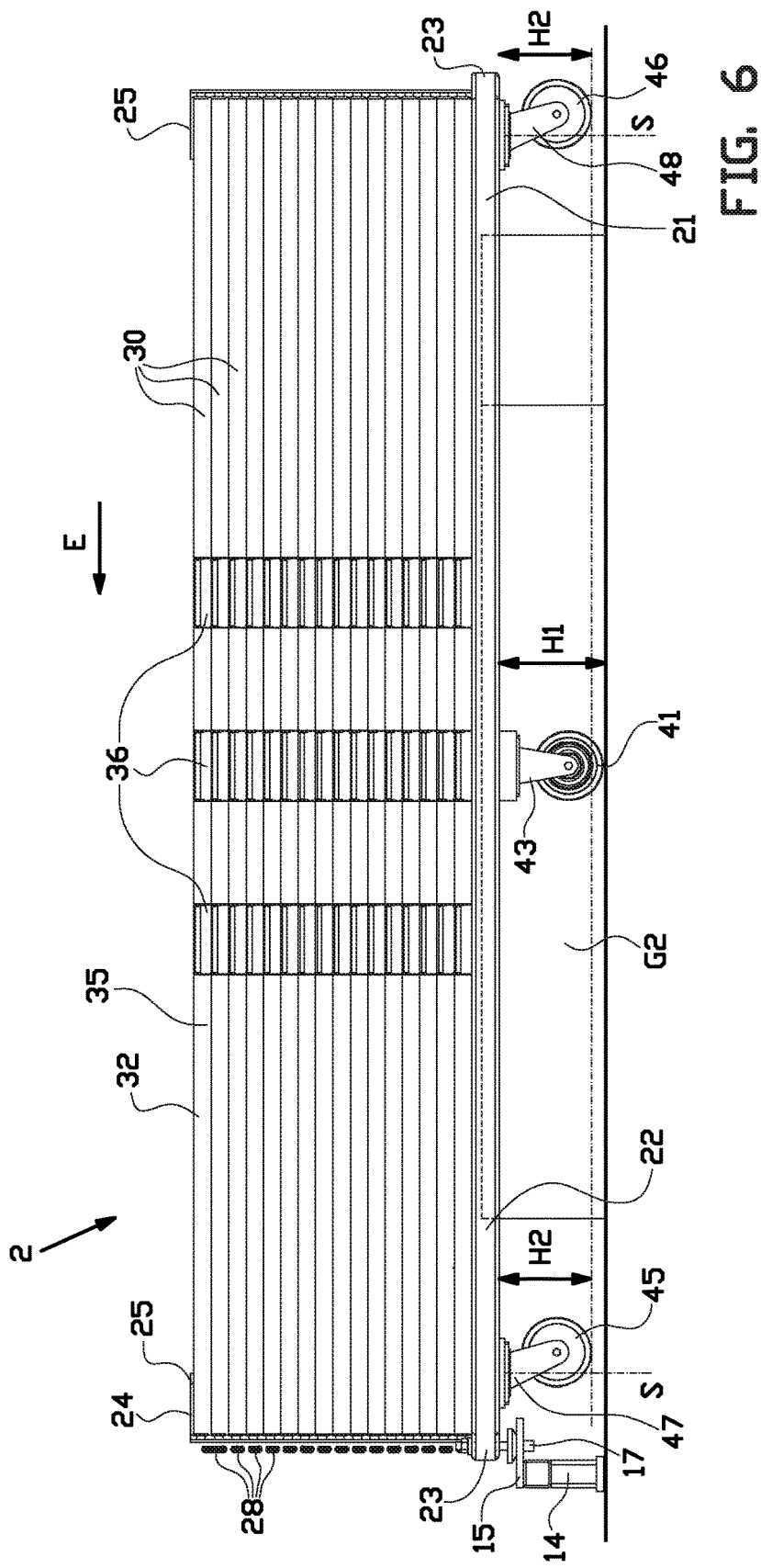
FIG. 6 shows a side of view of the tire tread carrier according to FIGS. 1 and 2.
Figure 7:
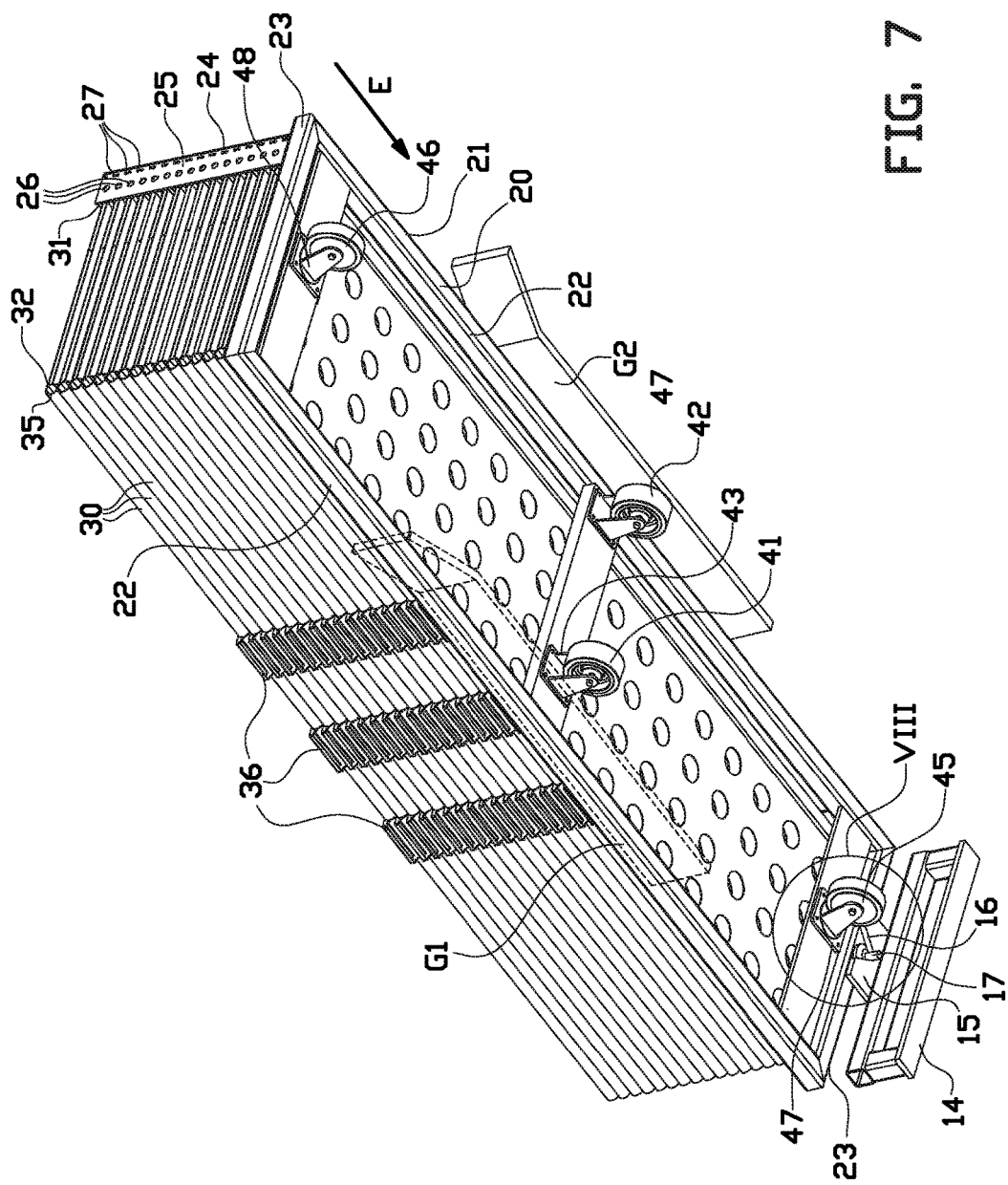
FIG. 7 shows a bottom view, in perspective, of the tire tread carrier according to 6.

As shown in FIGS. 1, 6 and 7, the tire tread carrier 2 comprises a frame 20 and a plurality of superimposed trays or plates 30 which are hingably coupled to the frame 20 so as to be rotatable between a closed, substantially horizontal position and an open, lifted position. The tire tread carrier 2 is elongate or extends in a longitudinal direction L for supporting the elongate treads 9 up-side down in said longitudinal direction L. In FIG. 1, the tire tread carrier 2 is shown in an unloading position within the unloading system 1. In the unloading position the longitudinal direction L is parallel to the longitudinal directions of the tire tread positioning device 5 and the tire tread transfer device 7, which longitudinal directions are therefore also indicated with the letter L. The frame 20 comprises a bottom section 21 with two longitudinal sides 22 in the form of longitudinal sidebars, extending parallel to the longitudinal direction L of the bottom section 21 and two transverse sides 23 in the form of transverse sidebars. The frame 20 is provided with a back section 24 which is connected to and stands up from the bottom section 21, preferably in a right angle with respect to the bottom section 21 and/or in a substantially or purely vertical direction. The height of the back section 24 with respect to the bottom section 21 defines the number of plates 30 that the tire tread carrier 2 can hold or store. Such a type of construction is known as a book-type tread carrier or a book car, because the plates 30 open with respect to the back section 24 like the pages with respect to the back cover of a book.

The back section 24 is provided with a series of hinge elements 26 for hingably supporting the plates 30 with respect to the back section 24. The hinge elements 26 are equally distributed in the upright direction of the back section 24 and define axes of rotation R for the plates 30, parallel to longitudinal sides 22 of the bottom section 21. In this example, the back section 24 is formed by two uprights 25 with an L-shaped or angled cross section, one at each transverse side 23 of the bottom section 21. Each upright 25 comprises hinge elements 26 in the form of a series of hinge holes 26 which are equally distributed in the upright direction of the back section 24. Each of the hinge holes 26 of one of the upright 25 has a corresponding, coaxial hinge hole 26 at the other upright 25, commonly defining one of the aforementioned axes of rotation R. Next to each hinge hole 26, a spring hole 27 is provided for receiving and retaining the end of a biasing element, in this example a spring 28. The spring 28 is connected to the plate 30 that is hingably supported by the respective hinge hole 26. The spring hole 27 is offset with respect to the respective hinge hole 26 such that the spring 28 exerts a biasing force on the connected plate 30 to urge or bias the plate 30 towards the open, lifted position. In particular, the spring 28 is arranged such that, when the connected plate 30 reaches a certain lift angle with respect to the horizontal, in this example at approximately 45 degrees, the biasing force exceeds the gravity force acting on the connected plate 30. Thus, from an angle of 45 degrees and upwards, the connected plate 30 will be biased to the open, lifted position.

Figure 2:
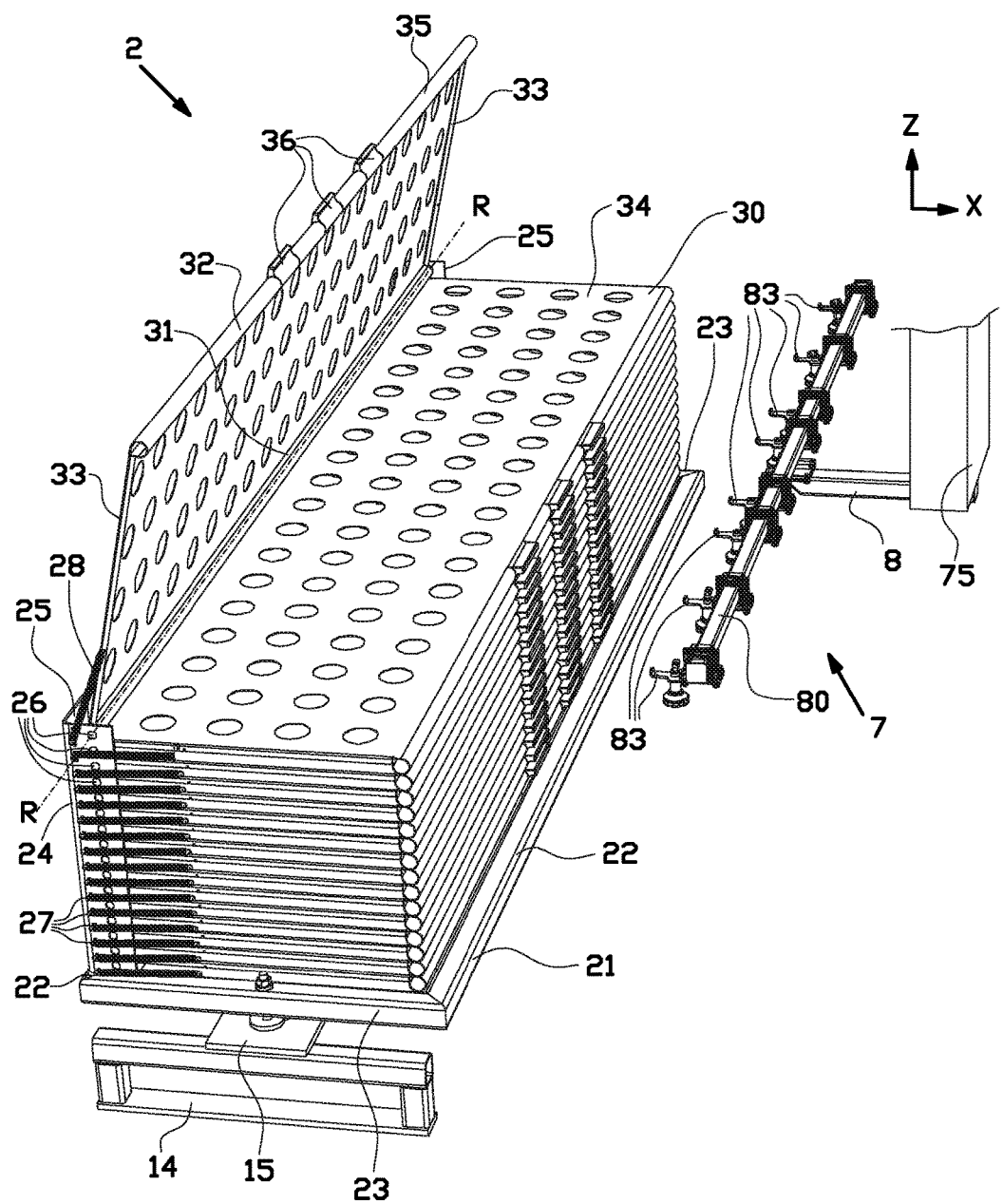
FIG. 2 shows a partial view in perspective of the tire tread carrier and the arm according to FIG. 1.

The plates 30 are best seen in FIGS. 1 and 2. All of the plates 30 are substantially identical. Each plate 30 is provided with a longitudinal back edge 31 extending parallel to and at or near the rotational axis R of the associated hinge holes 26 at the back section 24. Each plate 30 further comprises a longitudinal front edge 32, parallel to the back edge 31 yet at the opposite side of the plate 30 with respect to the back edge 31, facing away from the back section 21. The back edge 31 and the front edge 32 are connected by transverse edges 33 to form a rectangular, longitudinal support surface 34. The support surface 34 is provided with a pattern of holes or is perforated, to save weight and to prevent the treads 9 from sticking to the support surface 34. The dimensions of the support surface 34 are chosen such that they are sufficient to support at least one, and in this example at least three pre-cut treads 9 in the longitudinal direction of the plate 30. The treads 9 are placed substantially parallel to each other on the support surface 34 with their longitudinal direction extending in the longitudinal direction of the respective plate 30 and the longitudinal direction L of the tire tread carrier 2, parallel to the back edge 31 and the front edge 32. The front edge 32 is provided with a spacer 35 which faces downwards towards and rests on top of the support surface 34 of the plate 30 directly below, thereby ensuring that the plates 30 are spaced apart at the front edge 32 over the same distance as at the back edge 31 and that an intermediate storage space is kept free between directly subsequent plates 30 for storing the treads 9 without the treads 9 contacting the bottom of the subsequent plate 30 directly above. In this example, the spacer 35 is formed as a flange along the entire length of the front edge 32.

As shown in FIG. 2, each plate 30 is at least one, and in this example three engagement elements 36, in the form of box shaped catchers or receivers, protruding from the front edge 32 of the plate 30 away from the support surface 34 and towards the arm 7. In this example, the engagement elements 36 are grouped together at or near the center of the front edge 32. Alternatively, a smaller or greater number of engagement elements 36 may be distributed equally or unequally over the length of the front edge 32, not excluding the possibility of having a single engagement element 36 extending along a part of the entire length of the front edge 32.

FIGS. 6 and 7 show that the tire tread carrier 2 is provided with a number of castor wheels in order to be mobile on a factory floor F. Preferably, a plurality of identical tire tread carriers 2 is provided to enable exchanging an emptied tire tread carrier 2 by an identical full tire tread carrier 2. In this manner, the downtime of the unloading system can be reduced. The castor wheels of the tire tread carrier 2 comprise a set of two fixed wheels 41, 42 which are arranged in a fixed position by fixed wheel holders 43, 44 under the bottom section 21 at or near the middle, center or halfway along the longitudinal sides 22. The fixed wheels 41, 42 are fixed in the sense that their respective fixed wheel holders 43, 44 are not able to swivel with respect to the frame 20 of the tire tread carrier 2. The fixed wheels 41, 42 are however freely rotatable with respect to the fixed wheel holders 43, 44 about an axis of rotation, parallel to the transverse sides 23 of the bottom section 21. Preferably, both fixed wheels 41, 42 are rotatable about the same rotation axis. The fixed wheels 41, 42 are thus arranged coaxially. The fixed wheel holders 43, 44 hold the fixed wheels 41, 42 at a fixed distance from bottom section 21 of the tire tread carrier 2, thereby defining a first clearance height H1 between the bottom section 21 and the factory floor F.

The castor wheels of the tire tread carrier 2 further comprise a first swivel wheel 45 and a second swivel wheel 46 which are arranged by respective swivel wheel holders 47, 48 under the bottom section 21 at or near one of the transverse sides 23 and the other of the transverse sides 23, respectively. The swivel wheel holders 47, 48 are arranged to freely swivel with respect to the bottom section 21 about a respective, substantially vertical swivel axis S. The swivel wheels 45, 46 are arranged to be freely rotatable about a respective rotational axis that trails or is offset with respect to the respective swivel axis S, such that the swivel wheel holders 47, 48 are automatically swiveled into alignment with the direction of movement of their respective swivel wheels 45, 46. The swivel wheel holders 47, 48 hold the swivel wheels 45, 46 at a fixed distance from bottom section 21 of the tire tread carrier 2, thereby defining a second clearance height H2 between the bottom section 21 and the factory floor F. The second clearance height H2 at the transverse sides 23 is smaller than the first clearance height H1 at the center of the longitudinal sides 22. Thus, the tire tread carrier 2 may be balanced about the fixed wheels 41, 42 and, without intervention, will tend to tip or slant towards one of the transverse sides 23 until the respective swivel wheels 45, 46 of the tipped or slanted transverse side 23 comes into contact with the factory floor F. When balanced with both swivel wheels 45, 46 clear from the factory floor F, the tire tread carrier 2 can be easily pivoted or rotated on the spot, around the set of fixed wheels 41, 42 at the center thereof.

As shown in detail in FIG. 7, the factory floor F is provided with two guides G1, G2 tapering in an entry direction E. At the downstream end of the guides G1, G2 with respect to the entry direction E, the unloading system 1 comprises a stopper or receiving element 14 that is fixedly arranged on or with respect to the factory floor 4. The receiving element 14 comprises a receiver plate 15 with a receiving recess 16. The tire tread carrier 2 is provided with an insertion or coupling element 17 that cooperates with the receiving recess 16 in the receiver plate 15 to lock or fix the tire tread carrier 2 against retraction in a direction opposite to the entry direction E.

As shown in FIG. 8A, the receiving element 14 is provided with a catch 18 which is biased by a spring 13 to move downwards. The catch 18 can be lifted manually or may be provided with an inclined run-on surface to lift the catch 18 over and to hook the catch 18 behind a part of the tire tread carrier 2, in this example the leading transverse side 23 of the bottom section 21. The catch 18 is provided with a locking member 19 that hooks behind the transverse side 23 in the entry direction E. The coupling element 17 is provided with a conical tip that is inserted into the receiving recess 16 of the receiver plate 15. The tire tread carrier 2 is pushed with the coupling element 17 into the receiving recess 16 until the tire tread carrier 2 is 'dead' horizontal. The receiving element 14 may be adjustable in height to adjust the angle of the tire tread carrier 2. Alternatively, the coupling element 17 has an adjustable height with respect to the bottom section 21, e.g. via a cooperating threaded shaft and sleeve 12.

In FIGS. 8B and 8C, an alternative embodiment is shown with an alternative receiving element 114 and an alternative coupling element 117. The alternative receiving element 114 is again provided with a receiver plate 115 and a receiving recess 116 for receiving the coupling element 117 in the entry direction E. The receiving element 114 is further provided with an alternative catch 118 with a locking member 119 that is biased by a spring 113 to hook behind the coupling element 117 in a substantially horizontal plane. The coupling element 117 comprises two opposing conical shapes, resembling a diabolo shape, which is engaged by the locking member 119 at the narrow middle between the two conical shapes. The tire tread carrier 2 is pushed with the coupling element 117 into the receiving recess 116 until the tire tread carrier 2 is 'dead' horizontal. Again, the receiving element 114 may be adjustable in height. Alternatively, the coupling element 117 has an adjustable height with respect to the bottom section 21, e.g. via a cooperating threaded shaft and sleeve 112.

Figure 9:
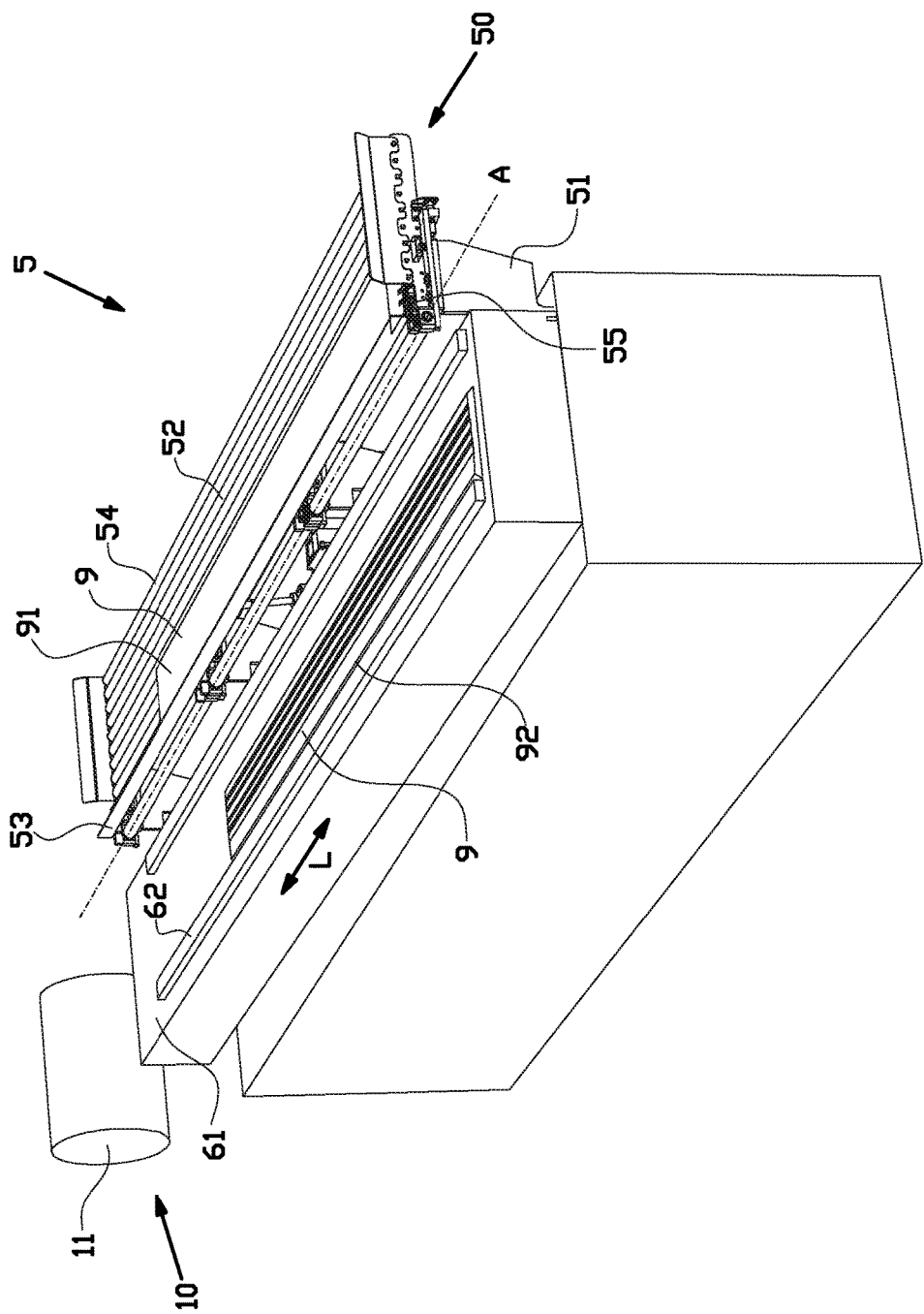
FIG. 9 shows a view in perspective of the tire tread positioning device according to FIG. 1.

In FIGS. 9 and 10, the tire tread positioning device 5 is shown in more detail. The tire tread positioning device 5 comprises a turn-table or flipping assembly 50 for turning over or flipping the treads 9 and a centering assembly 60 for centering the turned over treads 9 with respect to the subsequent station 10 of the tire building machine.

The flipping assembly 50 comprises a base 51 for placement on the factory floor F and an elongate flipping platform 52 for receiving one of treads 9 that has been unloaded by the tire tread transfer device 5 from the tire tread carrier 2. The flipping platform 52 is hingably attached to the base 51 so as to be rotatable about a flipping axis A, parallel to the longitudinal direction L of the tread 9. The flipping platform 52 is provided with an abutment element in the form of an abutment edge 53 for being in supporting abutment with the tread 9 during a substantial part of the flipping. The flipping platform 52 comprises a conveyor, preferably a roller conveyor 54, for conveying the tread 9 in a transverse direction, preferably perpendicular to its longitudinal direction L towards, against and/or into abutment with the abutment edge 53.

The flipping platform 52 furthermore comprises a detachment or separation element 55 which is able to move between a flush position (shown FIG. 10A) in which the upper surface of the separation element 55 is substantially flush with the surface defined by the rollers of the roller conveyor 54, and a separation position (shown FIG. 10B) at least partially out of the surface defined by the rollers of the roller conveyor 54 to separate the tread 9 from the roller conveyor 54. Preferably, the separation element 55 comprises one or more separation rollers 56 which in the flush position form a part or a continuation of the roller conveyor 54 and which, in the separation position are raised with respect to the other rollers of the roller conveyor 54. In this example, the abutment edge 53 is fixedly mounted to the separation element 55 so as to move together with the separation element 55 between the flush position and the separation position.

The flipping assembly 50 is provided with a flipping actuator, in this example pistons 57, for turning or flipping over the flipping platform 52 with respect to the base 51 about the flipping axis A from a receiving position (as shown in FIG. 10A) and a flipped position (as shown in FIG. 10B). The range of the pistons 57 is sufficient to turn or flip the flipping platform 52 over an angle of at least ninety degrees, and preferably at least ninety-five degrees with respect to the horizontal receiving position.

The centering device 60 is arranged for centering the tread 9 in a manner known per se and for subsequently feeding the tread 9 to the subsequent station 10, for example the drum 10 of a tire building machine. The centering device 60 is not described in further detail.

As shown in FIG. 1, the tire tread transfer device 7 comprises an horizontal overhead beam 70 with a horizontal rail 71, an arm assembly 72 movable via a linear transmission, e.g. a gear rack or a belt (not shown) along said horizontal rail 71 in a horizontal direction X, perpendicular to the longitudinal direction L of the tire tread carrier 2 when the tire tread carrier 2 is in the unloading position as shown in FIG. 1. The tire tread transfer device 7 is provided with a first actuator or drive 73 for driving the movement of the arm assembly 72 in the horizontal direction X along said horizontal rail 71. The arm assembly 72 is provided with an arm base 74 that is slidably supported on the horizontal rail 71, a vertical beam 75 that is coupled to the arm base 74 via a linear transmission, e.g. via a gear rack or a belt (not shown), so as to be movable in a vertical direction Z (sometimes referred to as direction Y) with respect to the arm base 74 and a second actuator or drive 76 for driving the movement of the vertical beam 75 in the vertical direction Z with respect to the arm base 74. The respective drives 73, 76 are operationally connected to a control system 77, which is arranged for controlling the movements in the horizontal direction X and the vertical direction Z. The combination of the drives 73, 76 can thus by characterized as an 'XZ' drive system (or alternatively as an 'XY' drive system)

As best seen in FIG. 2, the arm assembly 72 comprises an arm 8 suspended from or at the bottom end of the vertical beam 75. The arm 8 is movable both together with the vertical beam 75 in the vertical direction Z with respect to the arm base 74 as well as in the vertical direction Z together with the arm base 74 along the horizontal rail 71. Thus, the position of the arm 8 can be controlled in at least the horizontal directions X and the vertical direction Z and can move in any lifting direction which is a sum of vector components in both said directions X, Z.

The arm 8 comprises a pick-up element in the form of a pick-up beam 80 which is arranged to extend in a direction parallel to the longitudinal direction L of the tire tread carrier 2, when the tire tread carrier 2 is placed in the unloading position as shown in FIG. 1. The arm 8 is with a retaining device 81 for picking up and retaining one of the treads 9 on the tire tread carrier 2 and a lifting device 82 for lifting the plates 30 of the tire tread carrier 2 into the lifted, open position.

Figure 4:
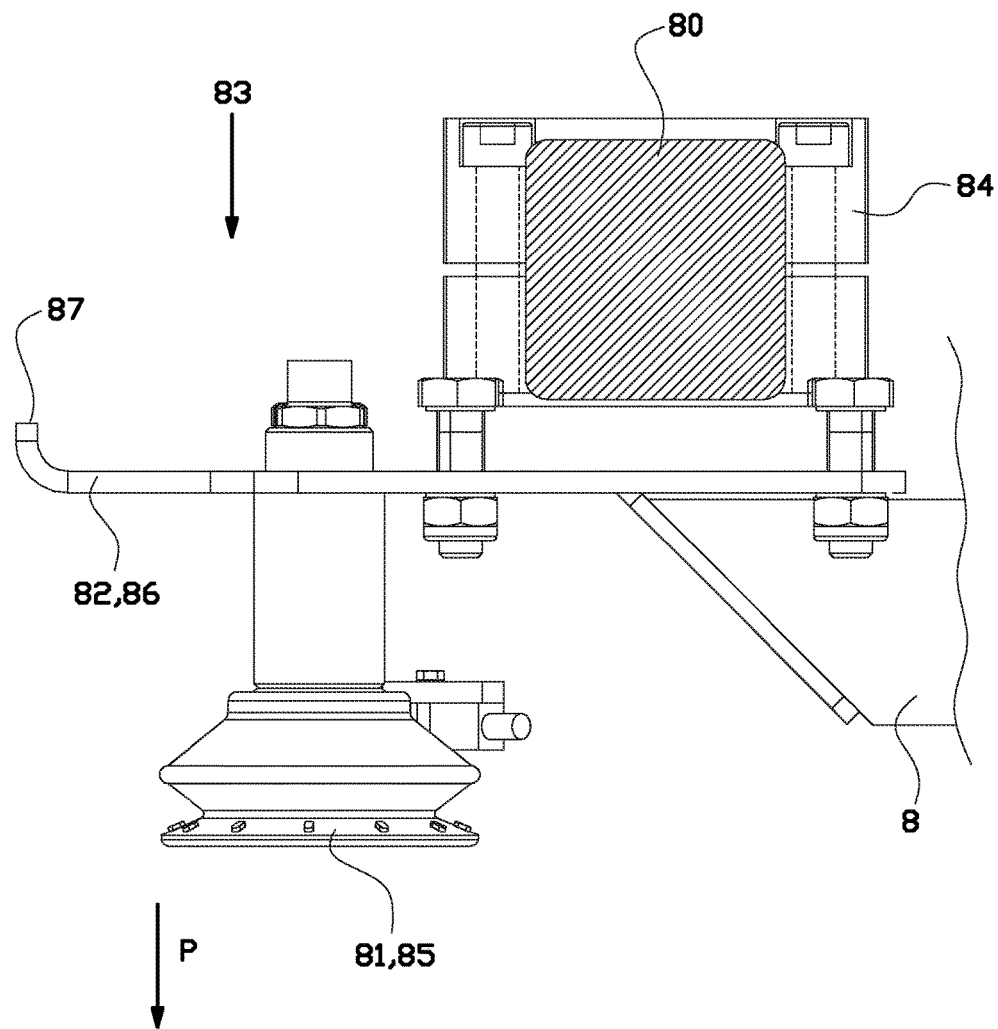
FIGS. 4 and 5 show details of the arm according to FIGS. 1 and 2.

In this exemplary embodiment of the invention, the lifting device 82 is provided on or coupled to the retaining device 81 to form a plurality of retaining and lifting elements 83, one of which is shown in more detail in FIG. 4. The retaining and lifting elements 83 are distributed along the pick-up beam 80. The retaining elements 81 face downwards to retain one of the treads 9 on the tire tread carrier 2 from above. The number and distribution of the retaining and lifting elements 83 along the pick-up beam 80 is chosen optimally to ensure a firm pick-up of the one tread 9 along the entire length thereof.

As shown in FIG. 4, the retaining and lifting element 83 comprises a clamp 84 for clampingly engaging the pick-up beam 80 along a longitudinal position thereof and a vacuum powered suction cup 85 that is operationally coupled to the clamp 84. Each suction cup 85 is connected via tubing (not shown) to a vacuum source (not shown) in a manner known per se. The retaining and lifting element 83 further comprises a hook 86 protruding beyond the suction cup 85 in towards the tire tread carrier 2. The hook 86 forms a leading or distal tip of the arm 8 when approaching the tire tread carrier 2. The hooks 86 protrude sufficiently far beyond the other elements of the arm 8, such as the pick-up beam 80 and the suction cups 85, such that solely the hooks 86 may be brought into contact or engagement with one of the closed plates 30 of the tire tread carrier 2 without another part of the arm 8 contacting or interfering with the tire tread carrier 2, and more in particular the engaged plate 30. The other parts of the arm 8 are spaced apart or free from the engaged plate 30. The hook 86 has an upwardly facing rim, edge, flange or tip 87 that is arranged to hook underneath the engagement elements 36 of a selected, closed plate 30 of the tire tread carrier 2.

Alternatively, the retaining device 81 and the lifting device 82 may be provided as separate elements. For example, the suction cups 85 and the hooks 86 as shown in FIG. 2 may be separately supported on the pick-up beam 80 by individual clamps 84.

Figure 5:
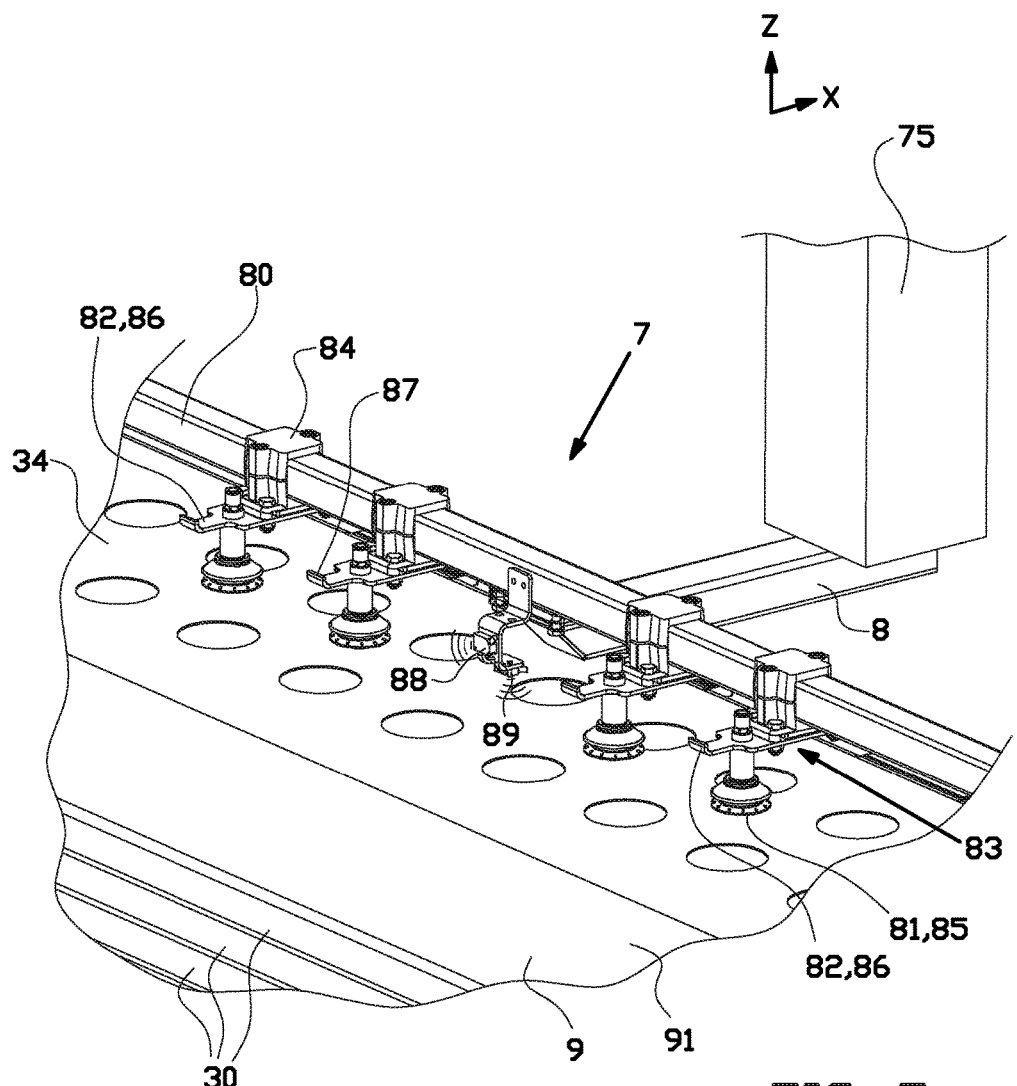

As shown in FIG. 5, the arm 8 further comprises a first sensor 88 for detecting the position of the plates 30, in particular the engagement elements 36 thereof, and a second sensor 89 for detecting the position of the treads 9 on the plates 30. In this example, the first sensor 88 and the second sensor 89 are mounted on a bracket that is attached to the front of the pick-up beam 80, at or near the center, middle or halfway along the length thereof. The first sensor 88 faces in the direction of the tire tread carrier 2 when the tire tread carrier 2 is placed in the unloading position as shown in FIG. 1. The second sensor 89 faces vertically downwards. The first sensor 88 is preferably arranged at approximately the same height as the hooks 88 or just above the height of the hooks 88. The second sensor 89 is preferably arranged substantially in line with the suction cups 85.

The method for unloading one or more of the treads 9 from the tire tread carrier 2 as shown in FIG. 1, will be elucidated below.

In a first part of the method, a full tire tread carrier 2 is moved into the unloading position in the entry direction E as shown in FIG. 1. Optionally, an empty tire tread carrier 2 is first retracted or removed in a direction opposite to the entry direction E prior to the entry of the full tire tread carrier 2. The full tire tread carrier 2 is moved into the unloading position by pushing it manually or by machine in the entry direction E towards the guides G1, G2. The guides G1, G2 are spaced apart at approximately the distance between the longitudinal sides 22 of the bottom section 21 of the tire tread carrier 2. Once the tire tread carrier 2 enters the space between the guides G1, G2, the longitudinal sides 22 will be guided by the guides G1, G2, thereby limiting freedom of movement or substantially fixing the position of the tire tread carrier 2 in a horizontal direction transverse or perpendicular to the entry direction E. The tire tread carrier 2 is subsequently pushed further in the entry direction E until the coupling element 17, 117 interacts with the receiving element 14, 114 (see FIGS. 8A-8C). After coupling, the tire tread carrier 2 is locked or fixed in both the entry direction E and the direction transverse to the entry direction E. Also, the interaction between the coupling element 17, 117 and the receiving element 14, 114 prevents tipping of the tire tread carrier 2 about the fixed wheels 41, 42 at the center of the tire tread carrier 2 and ensures that the plates 30 of the tire tread carrier 2 extend substantially horizontally.

Figure 3A:
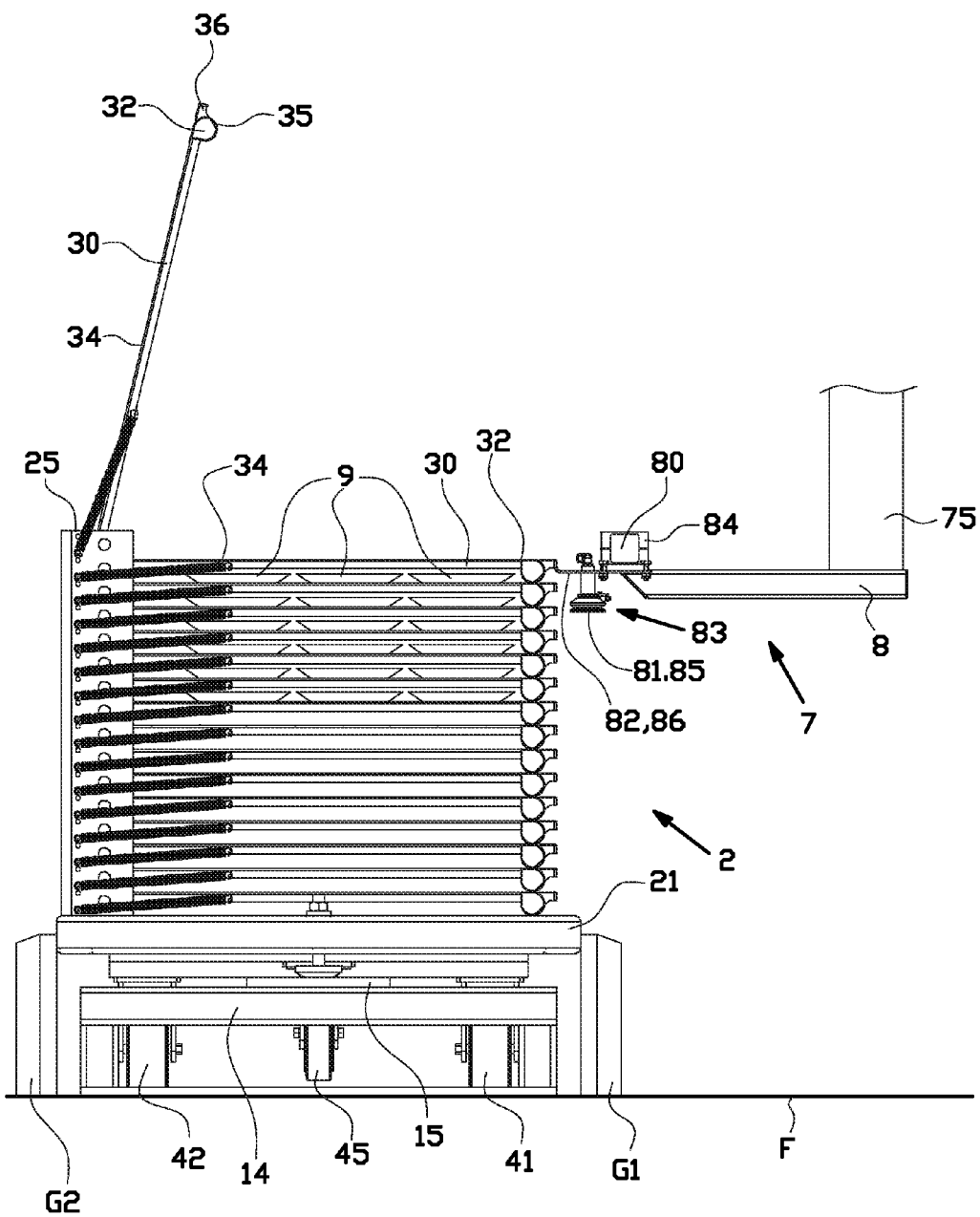
FIGS. 3A-3D show steps of a method of unloading a tread with the use of the tire tread carrier and the arm according to FIGS. 1 and 2.

Now, the full tire tread carrier 2 is secured in the unloading position and may be unloaded. A group of plates 30 is in the horizontal, closed position. During unloading, the treads 9 supported on the top one of the group of horizontal plates 30 are subsequently picked-up and transferred by the tire tread transfer device 7 to the tire tread positioning device 5, in a manner which will be described later. Once the top one of the group of horizontal plates 30 has been emptied (as shown in FIG. 3A), it blocks the access to a lower one of the group of horizontal plates 30 which still supports treads 9 to be picked-up and transferred. In such an event a second part of the method is performed.

In the second part of the method, the empty top plate 30 of the group of horizontal plates 30 is lifted from the horizontal, closed position into the lifted, open position to expose the underlying lower one of the plates 30. First, the control system 77 controls the first drive 73 and the second drive 76 to move the arm 8 towards the group of horizontal plates 30. During the approach towards or at the plates 30, the first sensor 88 (see FIG. 5) detects the position of the empty top plate and sends detection signals indicative of the presence and/or the position of said empty top plate 30 to the control system 77. When the empty top plate 30 is detected by the first sensor 88, the control system 77 controls the drives 73, 76 to move the arm 8 into a starting position, as shown in FIG. 3A, in which at least some of the hooks 86 extend at least with their tips 87 underneath the empty top plate 30. In particular, the tips 87 of the hooks 86 which, in the horizontal direction X, are positioned directly opposite to the engagement elements 36 of the empty top plate 30, are located directly underneath or in the vertical direction Z directly below the respective engagement elements 36 of the empty top plate 30.

Alternatively, a human operator can input data into the control system 77 about the dimensions and characteristics (e.g. the number and the positions of the plates 30) of the tire tread carrier 2 currently in the unloading position, based on which the starting position for a respective empty top plate 30 is determined.

When the tips 87 of at least some of the hooks 86 are in the starting position underneath the respective engagement elements 36 of the empty top plate 30, the control system 77 controls the drives 73, 76 to move the arm 8 upwards, thereby hooking or catching the tips 87 of the at least some of the hooks 86 behind or in the engagement elements 36.

Figure 3B:
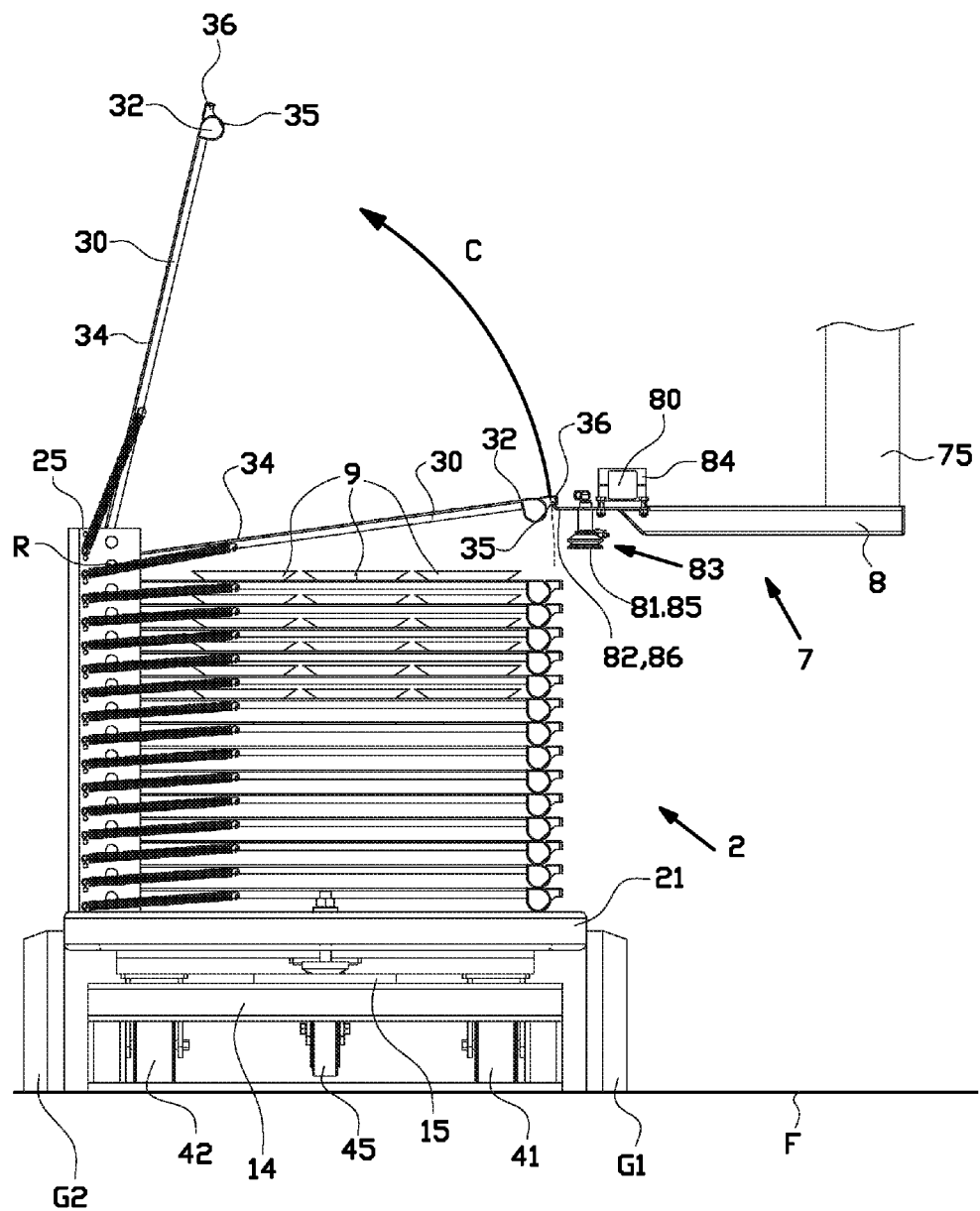

With the hooks 86 engaged on the engagement elements 36, the arm 8 thus starts lifting the empty top plate 30 upwards from the horizontal, closed position towards the open, lifted position, as shown in FIG. 3B. In particular, the control system 77 controls the drives 73, 76 simultaneously such that arm 8 follows lifting path with a curvature C that is substantially concentric to the rotation axis R of the empty top plate 30. More in particular, the tips 87 at the ends of the hooks 86 are arranged to follow a lifting path at substantially the same or the exact same curvature C that is travelled by the respective engagement elements 36 of the empty top plate 30. In this manner, it can be ensured that the tips 87 of the hooks 86 follow and/or stay in engagement with the engagement elements 30 during a substantial part of the curvature C travelled by said engagement elements 30.

Figure 3C:
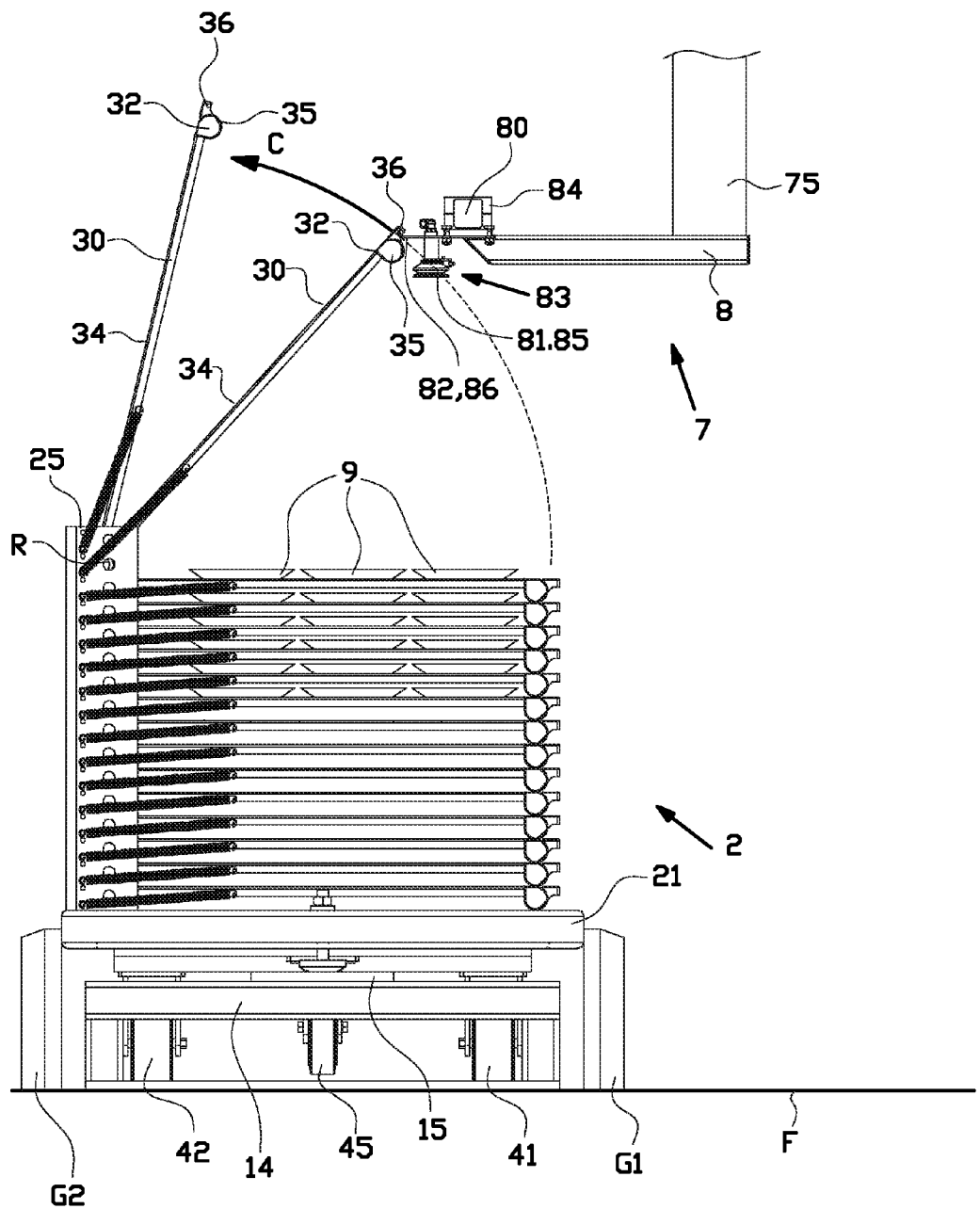
Figure 3D:
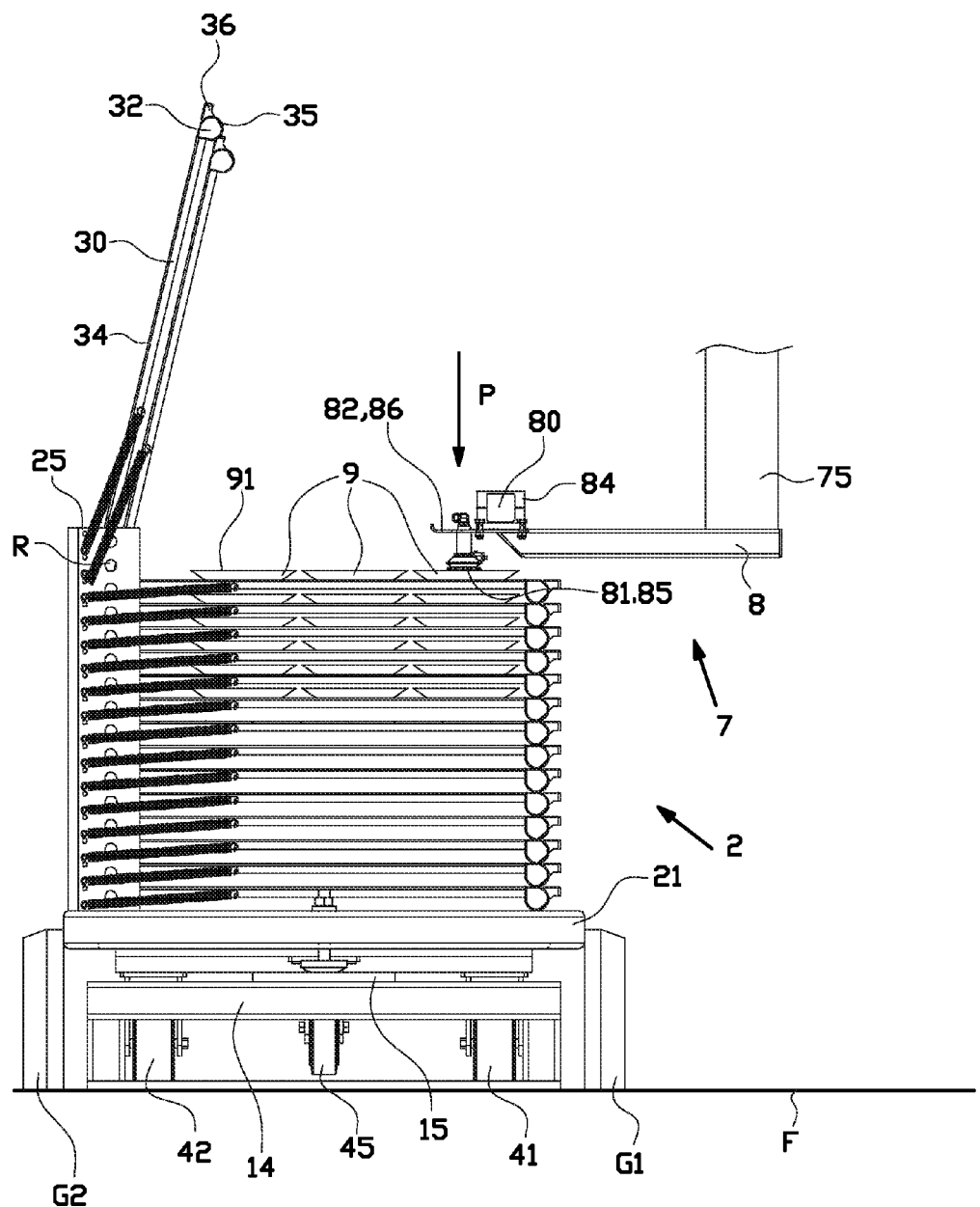

In FIG. 3C, the situation is shown in which the empty top plate 30 has already been partially lifted along the curvature C towards the open, lifted position as shown in FIG. 3D. The angle of the lifted, empty top plate 30 with respect to the remaining closed plates 30 of the group of horizontal plates 30 and the horizontal is a little bit over forty-five degrees. At this moment, the spring 28 connected to the lifted, empty top plate 30 is exerting a biasing force on the lifted, empty top plate 30 towards the open, lifted position. At a certain angle over forty-five degrees, the lifted, empty top plate 30 will continue to be lifted towards the open, lifted position by the biasing force only. At that moment, the lifting operation of the arm 7 may be terminated and the lifted, empty top plate 30 will be moved into the open, lifted position and remain there by the biasing force of the spring 28.

In FIG. 3D, the situation is shown in which the plate 30 directly underneath the lifted, empty top plate 30 has been exposed. In particular, the support surface 34 with the treads 9 supported thereon is easily accessible by the arm 8.

In a third part of the method, one of the exposed treads 9 on the support surface 34 of the exposed plate 30 is picked-up and transferred by the arm 8 from the tire tread carrier 2 to the tire tread positioning device 5. First, the control system 77 controls the drives 73, 76 to move the arm 8 downwards in a pick-up direction P towards the expected, preprogrammed or detected position of one of the exposed treads 9, as shown in FIG. 3D. The second sensor 89 detects the presence and/or position of the exposed treads 9 and sends detection signals indicative of the presence and/or position of the exposed treads 9 to the control system 77. The control system 77 then controls the drives 73, 76 to position the arm 8 with its suction cups 85 directly above one of the exposed treads 9 and to subsequently move the suction cups 85 downwards into a pick-up position, as shown in FIG. 3D, in which the suctions cups 85 are in direct contact with the one tread 9. The suction cups 85 are activated, thereby retaining the one tread 9 by suction. The control system 77 subsequently controls the drives 73, 76 to move the arm 8 and the picked up and retained tread 9 upwards and away from the tire tread carrier 2, thereby staying free from the tire tread carrier 2. The arm 8 is subsequently controlled to move into a releasing position vertically above or in the vertical direction Z directly above the flipping platform 52. The suctions cups 85 are deactivated and the transferred tread 9 is released from the arm 8 onto the flipping platform 52, to arrive at the situation as shown in FIGS. 9 and 10A.

In the fourth part of the method, the plates 30 are flipped by the flipping assembly 50 into a correct 'up side up' orientation in which the top 92 faces upwards. As shown in FIGS. 9 and 10A, the transferred tread 9 is released onto the flipping platform 52 'up side down', with the top side 92 lying on the roller conveyor 54. The flipping platform 52 is in the receiving position for receiving and supporting the tread 9 in a substantially horizontal orientation. The roller conveyor 54 is operated to move the transferred tread 9 transverse, sideways or perpendicular to its longitudinal direction L towards and into abutment with the abutment edge 53. As best seen in FIG. 10A, the transferred tread 9 now lies at least partially on the separation element 55. Subsequently, the pistons 57 are activated to rotate or turn the flipping platform 52 in the flipping direction B into the flipped position, as shown in FIG. 10B. During the rotation, the transferred tread 9 is solely retained on the flipping platform 52 by gravity or gravitational force. The flipping platform 52 is rotated over at least ninety degrees, and preferably more than ninety-five degrees, about the flipping axis A, such that the tread 9 tends to release under the influence of gravity or gravitational force from the flipping platform 52 and/or fall or freefall onto the adjacent centering assembly 60. To overcome sticking of the tread 9 to the flipping platform 52, the separation element 55 is rotated even further in a separation direction K into the separation position, for example over another ten degrees, to forcibly detach the tread 9 from the flipping platform 52. The tread 9 is allowed to fall onto centering assembly 60, without additional clamping or guidance. The tread 9 falls on the centering assembly 60 in the 'up side up' orientation, with its top side 92 facing upwards.

The centering assembly 60 subsequently centers the flipped tread 9 with respect to the subsequent station 10, in this example the drum 11 of a tire building machine in a manner known per se and then feeds the flipped tread 9 towards said subsequent station 10.

It is observed that the tire tread carrier 2, the tire tread positioning device 5 and the tire tread transfer device 7 of the unloading system 1 can be applied individually, wherever possible. In this respect, it is noted that each part of the method as described above, can be performed individually as well.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. An unloading system for unloading a tire tread carrier, wherein the tire tread carrier comprises a frame and a plurality of plates which are hingably connected to the frame so as to be rotatable about respective, mutually parallel rotation axes for subsequent opening by rotation about said rotation axes from a closed, substantially horizontal position to an open, lifted position, wherein each plate is arranged for supporting at least one tread for a tire, wherein the unloading system comprises an arm with a retaining device for picking up and retaining treads from the plates, a drive system for moving the arm and a control system, operationally coupled to the drive system, wherein the control system is arranged for controlling the drive system to position the arm with respect to the tire tread carrier, wherein the arm is provided with a lifting device that is arranged to move together with the arm for lifting one of the plates, wherein the control system is arranged for controlling the drive system to position the arm in a starting position in which the lifting device extends at least partially underneath said one plate and to subsequently move the arm upwards such that the lifting device is moved towards a lifting position, thereby lifting said one plate from the closed position towards the open position.

2. The unloading system according to claim 1, wherein the control system is arranged for controlling the drive system such that during the movement of the lifting device from the starting position towards the lifting position, the lifting device follows a lifting path with a curvature that is concentric to the rotation axis of the one plate.

3. The unloading system according to claim 1, wherein the drive system comprises at least a first drive and a second drive for moving the arm in a first direction and a second direction, respectively, wherein the control system is arranged for controlling the first drive and the second drive to move the arm in a lifting direction which is a sum of the movements in both the first direction and the second direction, wherein the control system is arranged for controlling the first drive and the second drive so that the lifting direction of the arm follows the curvature that is concentric to the rotation axis of the one plate.

4. The unloading system according to claim 1, wherein the lifting device comprises one or more hooks, wherein each hook is provided with an upwardly facing tip which is arranged to engage the one plate from below.

5. The unloading system according to claim 4, wherein the one or more hooks protrude from the arm such that, when the one or more hooks are in engagement with the one plate, solely said one or more hooks engage with or contact the one plate.

6. The unloading system according to claim 4, wherein the one plate is provided one or more engagement elements for receiving the tips of the one or more hooks.

7. The unloading system according to claim 4, wherein the arm comprises a pick-up beam that is arranged to extend parallel to the rotation axis of the one plate, wherein the lifting device comprises a plurality of the hooks which are distributed along the pick-up beam, wherein the plurality of the hooks is arranged for engaging the one plate along various spaced apart engagement positions parallel to its rotation axis.

8. The unloading system according to claim 6, wherein the retaining device is provided with one or more retaining elements, wherein the one or more hooks are provided on the one or more retaining elements.

9. The unloading system according to claim 1, wherein the tire tread carrier is provided with a biasing element which is arranged for biasing the one plate into the open, lifted position, wherein the control system is arranged for controlling the drive system to move the arm such that the one plate is only partially lifted towards the open, lifted position, wherein the biasing element is arranged to contribute to the lifting to fully lift the one plate into the open, lifted position.

10. The unloading system according to claim 1, wherein the arm is provided with a first sensor for detecting the position of the one plate and for sending signals indicative of the position of the one plate to the control system, wherein the control system is arranged for controlling the drive system to move the arm into the starting position based on the signals from the first sensor.

11. Unloading system according to claim 1, wherein the arm is provided with a second sensor for detecting the position of at least one of the treads on the plate and for sending signals indicative of the position of the at least one tread to the control system, wherein the control system is arranged for controlling the drive system to move the arm into a pick-up position based on the signals from the second sensor, wherein, in the pick-up position, the retaining device is located directly above the detected one tread to retain said detected one tread.

12. The unloading system according to claim 1, wherein the treads are placed in an up-side-down orientation on the plates, wherein the unloading system further comprises a tire tread positioning device with a flipping assembly, wherein the flipping assembly is provided with a base and a flipping platform that is rotatable with respect to said base about a flipping axis between a substantially horizontal receiving position and a flipped position, wherein, when the flipping platform is in the receiving position, the arm is arranged for releasing a picked-up and retained tread onto the flipping platform in the up-side-down orientation with the longitudinal direction of the tread extending parallel to flipping axis, wherein the flipping actuator is arranged for rotating the flipping platform over an angle of at least ninety degrees or at least ninety-five degrees about the flipping axis from the receiving position to the flipped position, wherein during the rotation of the flipping platform, the tread is retained on the platform solely by gravity and wherein the tread is allowed to freely separate from the flipping platform under the influence of gravity.

13. The unloading system according to claim 12, wherein the flipping platform is provided with an abutment element at the side of and extending parallel to the flipping axis for supporting the tread through abutting contact in a direction transverse to the longitudinal direction of the tread during the rotation from the receiving position towards the flipped position.

14. The unloading system according to claim 13, wherein the flipping platform is provided with a conveyor or a roller conveyor for moving the tread transverse to its longitudinal direction into abutment with the abutment element.

15. The unloading system according to claim 12, wherein the flipping platform is provided with a separation element which is arranged for at least partly supporting the tread on the flipping platform, wherein the separation element is arranged for rotation in a separation direction from a flush position in which the upper surface of the separation element is substantially flush with the remaining surface of the flipping platform and a separation position in which the separation element is raised with respect to the remaining surface of the flipping platform to separate the tread from said remaining surface.

16. The unloading system according to claim 12, wherein the tire tread positioning device comprises a centering assembly adjacent to the flipping assembly, wherein the centering assembly is provided with a centering surface for receiving the tread from the flipping platform, wherein during the transfer of the tread from the flipping assembly to the centering assembly, the tread is flipped over an angle of one-hundred-and-eighty degrees from the up-side-down orientation into an up-side-up orientation, wherein the flipping platform, in the flipped position, has been rotated over only a part of the one-hundred-and-eighty degrees, over less than one-hundred-and-twenty degrees or over less than one-hundred degrees, wherein the tread is allowed to separate and fall over the remaining angle under the influence of gravity.

17. The unloading system according to claim 1, wherein the unloading system comprises the aforementioned tire tread carrier, wherein the frame of the tire tread carrier is provided with a bottom section having two longitudinal sides and two transverse sides, wherein the tire tread carrier is provided with a set of two fixed wheels mounted under said bottom section at or near the center of the longitudinal sides and a set of two swivel wheels mounted under said bottom section at or near the transverse sides, wherein the wheels are arranged for rolling over a factory floor, wherein the fixed wheels define a first clearance height between the bottom section and the factory floor and the swivel wheels define a second clearance height between the bottom section and the factory floor which is less than the first clearance height.

18. The unloading system according to claim 17, wherein the unloading system comprises a receiving element which is arranged to be fixed to the factory floor at an unloading position for the tire tread carrier, wherein the tire tread carrier is provided with a coupling element that is arranged for insertion into the receiving element in an entry direction, wherein the receiving element is provided with a catch that cooperates with the coupling element to lock the tire tread carrier against retraction in a direction opposite to the entry direction.

19. The unloading system according to claim 18, wherein the catch is arranged for catching behind a part of the frame of the tire tread carrier in a direction opposite to the entry direction.

20. The unloading system according to claim 19, wherein the catch is arranged for catching behind the coupling element of the tire tread carrier in a direction opposite to the entry direction.

21. The unloading system according to claim 18, wherein the coupling element or the receiving element are adjustable in height to adjust the angle of the tire tread carrier with respect to the factory floor.

22. A method for unloading a tire tread carrier with the use of an unloading system, wherein the tire tread carrier comprises a frame and a plurality of plates which are hingably connected to the frame so as to be rotatable about respective, mutually parallel rotation axes for subsequent opening by rotation about said rotation axes from a closed, substantially horizontal position to an open, lifted position, wherein each plate is arranged for supporting at least one tread for a tire, wherein the unloading system comprises an arm with a retaining device for picking up and retaining treads from the plates, wherein the arm is provided with a lifting device that is arranged to move together with the arm for lifting one of the plates, wherein the method comprises the steps of positioning the arm in a starting position in which the lifting device extends at least partially underneath said one plate and subsequently moving the arm upwards such that the lifting device is moved towards a lifting position, thereby lifting said one plate from the closed position towards the open position.

23. The method according to claim 22, wherein, during the movement of the lifting device from the starting position towards the lifting position, the lifting device follows a lifting path with a curvature that is concentric to the rotation axis of the one plate.

24. The method according to claim 22, wherein the treads are placed in an up-side-down orientation on the plates, wherein the unloading system further comprises a tire tread positioning device with a flipping assembly, wherein the flipping assembly is provided with a base and a flipping platform that is rotatable with respect to said base about a flipping axis between a substantially horizontal receiving position and a flipped position, wherein the method comprises the steps of releasing a picked-up and retained tread from the arm onto the flipping platform in the up-side-down orientation with the longitudinal direction of the tread extending parallel to flipping axis, rotating the flipping platform over an angle of at least ninety degrees or at least ninety-five degrees about the flipping axis from the receiving position to the flipped position, wherein during the rotation of the flipping platform, the tread is retained on the platform solely by gravity and wherein the tread is allowed to freely separate from the flipping platform under the influence of gravity.

25. The method according to claim 24, wherein the flipping platform is provided with a separation element which is arranged for at least partly supporting the tread on the flipping platform, wherein the method comprises the step of rotating the separation element in a separation direction from a flush position in which the upper surface of the separation element is substantially flush with the remaining surface of the flipping platform and a separation position in which the separation element is raised with respect to the remaining surface of the flipping platform to separate the tread from said remaining surface.

26. The method according to anyone of claim 24, wherein the tire tread positioning device comprises a centering assembly adjacent to the flipping assembly, wherein the centering assembly is provided with a centering surface for receiving the tread from the flipping platform, wherein during the transfer of the tread from the flipping assembly to the centering assembly, the tread is flipped over an angle of one-hundred-and-eighty degrees from the up-side-down orientation into an up-side-up orientation, wherein after the step of rotating the flipping platform into the flipped position, the flipping platform has been rotated over only a part of the one-hundred-and-eighty degrees, over less than one-hundred-and-twenty degrees or over less than one-hundred degrees, wherein the method comprises the step of allowing the tread to separate and fall over the remaining angle under the influence of gravity.

* * * * *